US010584299B2

United States Patent
Notari et al.

(10) Patent No.: US 10,584,299 B2
(45) Date of Patent: Mar. 10, 2020

(54) HYDROGENATED POLYMERS WITH A RADIAL STRUCTURE HAVING A CORE BASED ON CALIXARENES AND USE THEREOF IN LUBRICANT COMPOSITIONS

(71) Applicants: ENI S.P.A., Rome (IT); Versalis S.P.A., San Donato Milanese (IT)

(72) Inventors: Marcello Notari, San Donato Milanese (IT); Claudio Cavallo, Forli (IT); Alberto Roselli, Paullo (IT); Alessandro Casnati, Parma (IT); Francesco Sansone, Parma (IT); Alessandro Burlini, Calvisano (IT)

(73) Assignees: Eni S.P.A., Rome (IT); Versalis S.P.A., San Donato Milanese (IT)

( * ) Notice: Subject to any disclaimer, the term of this patent is extended or adjusted under 35 U.S.C. 154(b) by 367 days.

(21) Appl. No.: 15/304,757

(22) PCT Filed: Apr. 16, 2015

(86) PCT No.: PCT/IB2015/052776
§ 371 (c)(1),
(2) Date: Oct. 17, 2016

(87) PCT Pub. No.: WO2015/159249
PCT Pub. Date: Oct. 22, 2015

(65) Prior Publication Data
US 2017/0051224 A1 Feb. 23, 2017

(30) Foreign Application Priority Data
Apr. 17, 2014 (IT) .............................. MI2014A0717

(51) Int. Cl.
*C10M 119/02* (2006.01)
*C08G 81/02* (2006.01)
*C10M 159/00* (2006.01)
*C08C 19/02* (2006.01)

(52) U.S. Cl.
CPC ........... *C10M 119/02* (2013.01); *C08C 19/02* (2013.01); *C08G 81/022* (2013.01); *C10M 159/005* (2013.01); *C10M 2209/101* (2013.01); *C10M 2213/04* (2013.01); *C10M 2229/00* (2013.01); *C10N 2220/029* (2013.01); *C10N 2230/02* (2013.01); *C10N 2230/68* (2013.01); *C10N 2260/02* (2013.01); *C10N 2270/00* (2013.01)

(58) Field of Classification Search
CPC .......... C10N 2220/029; C10N 2230/02; C10N 2230/68; C10M 2209/101; C10M 2213/04; C10M 2229/00; C08G 81/022
USPC ...................................................... 508/207
See application file for complete search history.

(56) References Cited

U.S. PATENT DOCUMENTS

| 3,554,911 A | 1/1971 | Schiff et al. |
| 3,668,125 A | 6/1972 | Anderson |
| 3,772,196 A | 11/1973 | St. Clair et al. |
| 3,775,329 A | 11/1973 | Eckert |
| 3,835,053 A | 9/1974 | Meier |
| 4,116,917 A | 9/1978 | Eckert |

(Continued)

FOREIGN PATENT DOCUMENTS

| EP | 578725 B1 | 6/1997 |
| EP | 585269 B1 | 6/1998 |

(Continued)

OTHER PUBLICATIONS

International Search Report for PCT/IB2015/052776 dated Jul. 16, 2015, 8 pgs.

(Continued)

*Primary Examiner* — Vishal V Vasisth
(74) *Attorney, Agent, or Firm* — Praedcere Law

(57) ABSTRACT

Hydrogenated polymers with a radial structure having a core made up of calixarenes of the general formula (I), to the core of which is linked a number P of hydrogenated linear polymer segments selected from: —hydrogenated homopolymers or copolymers of conjugated dienes; or —hydrogenated copolymers of said conjugated dienes and monoalkenyl arenes, and —mixtures thereof said formula (I) in which: —$R_1$, $R_2$, $R_3$ and $R_4$ are independently selected from hydrogen; a group containing carbon and hydrogen; a group also containing heteroatoms in addition to carbon and hydrogen; a group also containing silicon in addition to carbon, hydrogen and heteroatoms; —one of the two substituents $R_5$ and $R_6$ is hydrogen, while the other may be hydrogen or alkyl, with a number of carbon atoms between 1 and 6, preferably methyl and ethyl; —n is an integer in the range between 4 and 16.

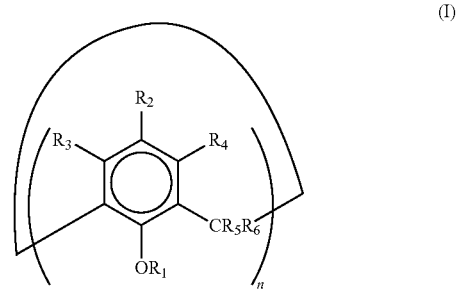

19 Claims, No Drawings

(56) References Cited

U.S. PATENT DOCUMENTS

| | | | |
|---|---|---|---|
| 4,699,966 A | * | 10/1987 | Harris ............... C08G 18/3215 528/12 |
| 5,840,814 A | | 11/1998 | Majoros et al. |
| 6,512,056 B1 | | 1/2003 | Kennedy et al. |

FOREIGN PATENT DOCUMENTS

| | | |
|---|---|---|
| EP | 1721910 B1 | 8/2008 |
| JP | S52-096695 A | 1/1977 |
| JP | H07-292038 A | 11/1995 |
| JP | 2000-515910 A | 11/2000 |
| JP | 2002-500682 A | 1/2002 |
| JP | 2002-338621 A | 11/2002 |
| JP | 2001-163934 A | 12/2002 |
| JP | 2004-149497 A | 5/2004 |
| JP | 2013-129833 A | 7/2013 |
| WO | 01/56968 A1 | 8/2001 |
| WO | 2012/055802 A1 | 5/2012 |

OTHER PUBLICATIONS

Gutsche, C. D. et al. Org. Synth. 1990, 68, 234-246.
Bew, S. P. et al. Chem. Commun. 2007, 975-977.
Bew, S. P. et al. J. Org. Chem. 2011, 76, 7076-7083.
Gutsche, C. D. Org. Prep. Proced. Int. 1992, 25, 137-139.
Gutsche, C. D. et al. J. Org. Chem., 1985, 50, 5802-5806.
Perret et al. New J. Chem., 2007, 31, 893-900.
Casnati, A. et al. Tetrahedron 1989, 45, 2177-2182.
Wang et al. Synthetic Communications 1999, 29, 3711-3718.
Pasquale, S. et al. Nat. Commun., 2012, 3, 785.
"Engine Oil Licensing and Certification System",API EOLCS, 1507—Industry Services Department, Fourteenth Edition, Dec. 1996, Addendum 1, Dec. 1998.
Office Action issued by the Indian Patent Office for Indian patent application 201617038419, dated Dec. 4, 2019, 6 pages. Translation to English is provided.
Office Action issued by the Japanese Patent Office for Japanese patent application 2016-563084, dated Dec. 26, 2019, 6 pages. Translation to English is provided.
Macromolecules, vol. 31, dated Sep. 12, 1998, pp. 6762-6768.

* cited by examiner

HYDROGENATED POLYMERS WITH A RADIAL STRUCTURE HAVING A CORE BASED ON CALIXARENES AND USE THEREOF IN LUBRICANT COMPOSITIONS

This application is a 371 of PCT/IB2015/052776, filed Apr. 16, 2015.

The present invention relates to hydrogenated polymers with a radial structure having a core based on calixarenes and to the method for the preparation thereof.

The polymers provided by the present invention may be used as viscosity index-improver additives in lubricant compositions.

In the present patent application, all the operating conditions mentioned in the text should be taken to be preferred conditions even if this is not explicitly stated.

For the purposes of the present explanations, the term "comprise" or "include" also encompasses the term "consist in" or "essentially consist of".

For the purposes of the present explanations, unless stated otherwise, range definitions always include the extremes.

In the present patent application, radial polymers are also known and denoted as star polymers.

It is known that the viscosity of lubricating oils varies with temperature. Many lubricating oils have to be used over a wide temperature range and it is thus important for the oil not to be too viscous at low temperature and not to be too fluid at elevated temperature. An oil's variation in viscosity with temperature is expressed by the value of the viscosity index. The higher is the viscosity index, the lower is the oil's variation in viscosity with temperature.

It is known to use polymer-based additives for the purpose of increasing the viscosity index of lubricating oils, so increasing the viscosity thereof at elevated temperature and as far as possible limiting any increase in low-temperature viscosity. Polymers which are usually used for improving the viscosity index are: ethylene-propylene copolymers, hydrogenated conjugated polydienes (e.g. hydrogenated polyisoprene), hydrogenated styrene-butadiene copolymers, hydrogenated styrene-isoprene copolymers and poly(alkyl methacrylates). The synthesis of linear hydrogenated polymers of conjugated dienes and of linear styrene-conjugated diene copolymers and the use thereof in lubricants are described, for example, in U.S. Pat. Nos. 3,554,911; 3,668, 125; 3,772,196; 3,775,329; 3,835,053; EP 585269 and EP 578725. For each of the above-stated classes of polymers, as molecular weight rises, so too does the thickening power and thus the quantity of polymer required to achieve a specific increase in viscosity of the oil at elevated temperature (thickening) falls. If a polymer is to be a good additive which improves the viscosity index, it must not only have a beneficial influence on the viscosity index of the fresh oil, but must also be stable and retain its function when the oil is in use in an engine. For this reason, a good additive must also have mechanical shear stability. It is known that the mechanical shear stability of a polymer falls with increasing molecular weight and thus selecting an additive which improves the viscosity index is usually a compromise between using large quantities of low molecular weight polymers which are resistant to mechanical shear and using small quantities of high molecular weight polymers which have poor resistance to mechanical shear.

It is furthermore known that the viscosity index-improver additives used in lubricating oils may contribute to varnish and carbon deposit formation in those parts of the engine which are exposed to elevated temperatures. The additives to be preferred will therefore be those which ensure a good thickening power and good shear stability with the minimum quantity of polymer.

U.S. Pat. No. 4,116,917 discloses a class of hydrogenated radial (star) polymers made up of a core of polydivinylbenzene (PDVB) to which are radially linked at least 4, preferably from 7 to 15, linear segments of hydrogenated conjugated polydienes or of hydrogenated styrene-conjugated diene copolymers.

Said radial polymers make it possible to increase thickening power when hot, to reduce the effect on lubricant viscosity when cold and to increase the mechanical shear stability of said additives. The method used for synthesising such star polymers is known as "arm first, core last" and provides: (a) anionic polymerisation of a conjugated diene or copolymerisation of a conjugated diene and styrene to form a living anionic polymer; (b) adding divinylbenzene to the living anionic polymer, initially forming a PDVB core, the vinyl groups of which are capable of reacting with the living anion so forming the star polymer; (c) hydrogenating the star polymer. Using such star polymers makes it possible to reduce, relative to known prior art polymers, the quantity required to achieve a specific thickening and a specific mechanical shear stability of the lubricating oils. The viscosity index-improver additives containing the star polymers disclosed in U.S. Pat. No. 4,116,917 are marketed by Infineum International Ltd.

Said class of radial polymers does, however, have a number of negative characteristics primarily associated with the PDVB core which:

has a crosslinked gel structure which is not well defined;
complicates control of the number of linear polymer segments linked to the core, so bringing about a certain degree of variability in the structure and characteristics of the radial polymer, such as for example mechanical shear stability and thickening.

Furthermore, making industrial use of divinylbenzene is problematic due to its elevated reactivity and tendency to give rise to unwanted polymerisation reactions.

It is thus desirable to obtain polymers made up of a core with a well-defined structure in such a manner as to have a well-defined number of polymer segments linked to said core.

Two different methods are known for obtaining star polymers having a core with a well-defined structure:
(1) using multifunctional initiators, a method known as "core first, arm last",
(2) using multifunctional reagent molecules capable of linking to the functional groups of previously formed polymers, a method known as "arm and core first".

Using multifunctional initiators to synthesise star polymers by anionic and cationic polymerisation is a method which is well-known, but not very widely used, due to problems with the solubility of the multifunctional initiator, especially in anionic polymerisation reactions.

In contrast, there are various prior art examples of using multifunctional reagents to synthesise star polymers by the "arm and core first" method. Examples of types of such multifunctional reagents which have been used as the core for obtaining star polymers are siloxanes, to which cationically-obtained polyisobutylene segments are linked by hydrosilylation reactions, and alkoxysilanes and halosilanes, to which living anionic polymer chains are linked by anionic polymerisation. Siloxanes, however, have the disadvantage of having low thermal and oxidation stability, while alkoxysilanes and halosilanes have the primary disadvantage of giving rise to the formation of star polymers made up of at most four polymer segments linked to the silicon core.

A further type of multifunctional reagents, which are generally characterised by a larger number of reactive functional groups and by excellent thermal and oxidative stability, are the calixarenes which are cyclic products derived from the condensation of p-substituted phenols and formaldehyde. Various calixarene compounds and the associated processes for the preparation thereof were developed by Gutsche and are mentioned for example in Houben-Weyl 6, 1036 and in the book "Monographs in Supramolecular Chemistry", Series Editor J. Fraser Stoddart, published by the Royal Society of Chemistry in 1989 and 1998.

U.S. Pat. No. 5,840,814 describes radial polymers having numerous well-defined arms linked to a well-defined core and the synthesis thereof (in the prior art, radial polymers are also known as star polymers).

The core is made up of a calix[n]arene, in which n ranges from 4 to 16, and the derivatives thereof, to which are connected at least three polymer arms.

Said polymer arms are preferably selected from polyisobutylene, polysiloxanes, in particular polydimethylsiloxane, or both.

U.S. Pat. No. 5,840,814 furthermore describes the synthesis methods for such radial polymers.

A first method provides that the polyisobutylene arms with terminal hydroxyl groups (—OH) are linked to the calixarene core which is made up of from 4 to 16 units and which includes at least one ester functional group for each unit, to which the polyisobutylene is linked by transesterification in the presence of a catalyst.

A second method provides that the polysiloxane arms, preferably polydimethylsiloxanes, with terminal Si—H groups are linked to the calixarene core which is made up of from 4 to 16 units and which includes at least one allyl functional group for each unit, to which the polysiloxane is linked by hydrosilylation in the presence of a catalyst.

A third method provides that the polyisobutylene arms with terminal hydroxyl groups (—OH) and the polysiloxane arms with terminal Si—H groups are linked to the calixarene core which is made up of from 4 to 16 units and which includes at least one ester functional group for each unit to which the polyisobutylene is linked by transesterification in the presence of a first catalyst, and an allyl functional group for each unit to which the polysiloxane is linked by hydrosilylation in the presence of a second catalyst.

U.S. Pat. No. 5,840,814 does not show examples of using the above-stated polymers in engine oils, and furthermore such products have the disadvantage of not being particularly suitable for use as additives for improving the viscosity index of lubricating oils. This is because it is known that polysiloxane-based polymers are not used for such an application and that polyisobutylene (PIB)-based products are not particularly effective in improving the viscosity index of oils, in that they have a good thickening power when hot, bringing about an increase in the viscosity at elevated temperature of the lubricating oil to which they are added, but they do not exhibit good behaviour when cold in that they also bring about an increase in the low-temperature viscosity of the oil. This behaviour complicates the use of such polymers for formulating lubricating oils of SAE 0W, 5W and 10W viscosity grades for which stringent limits are set for low-temperature viscosity values (CCS (Cold Cranking Simulator) viscosity). For this reason, when formulating multigrade lubricating oils, other additives belonging to other chemical classes have been preferred over polyisobutylene-based additives.

The applicant has surprisingly discovered that radial polymers containing a core made up of a calixarene of the general formula (I) to which are linked a number P of specific hydrogenated linear polymer segments have excellent characteristics with regard to thickening capacity, mechanical shear stability, thermo-oxidative stability and low-temperature behaviour and are therefore capable of overcoming the disadvantages of known prior art polymers used as additives in lubricating oils.

The present invention therefore relates to hydrogenated polymers with a radial structure having a core made up of calixarenes of the general formula (I), to the core of which is linked a number P of hydrogenated linear polymer segments selected from:

hydrogenated homopolymers or copolymers of conjugated dienes; or hydrogenated copolymers of said conjugated dienes and monoalkenyl arenes, and mixtures thereof The term "hydrogenated" refers to the selective hydrogenation of olefinic unsaturations, largely leaving the aromatic unsaturations unchanged.

The present invention also provides a synthesis method for the hydrogenated polymers with a radial structure described and claimed in the present text.

The radial polymers provided by the present invention have certain characteristics, such as thickening capacity, mechanical shear stability, thermo-oxidative stability, reduced tendency to form deposits and low-temperature behaviour, which make them highly suitable for use as additives capable of modifying the viscosity index of lubricating oils. In particular said polymers, made up of a calixarene core to which are linked hydrogenated polydiene segments and/or hydrogenated copolymers of conjugated dienes and monoalkenyl arenes, are capable of imparting rheological characteristics, mechanical shear stability, oxidative stability and resistance to the formation of deposits which are superior to those known in the prior art.

DETAILED DESCRIPTION

The present invention therefore provides hydrogenated polymers with a radial structure having a core made up of calixarenes of the general formula (I), to the core of which is linked a number P of hydrogenated linear polymer segments selected from:

hydrogenated homopolymers or copolymers of conjugated dienes; or hydrogenated copolymers of said conjugated dienes and monoalkenyl arenes, and mixtures thereof Said linear polymer segments are preferably hydrogenated homopolymers or copolymers of conjugated dienes selected from butadiene, isoprene, 1,3-pentadiene, 2,3-dimethyl-1,3-butadiene, 3-butyl-1,3-octadiene, 1-phenyl-1,3-butadiene and 1,3-hexadiene. The most preferred conjugated dienes are butadiene and isoprene.

Said linear polymer segments are preferably hydrogenated copolymers of conjugated dienes selected from butadiene, isoprene, 1,3-pentadiene, 2,3-dimethyl-1,3-butadiene, 3-butyl-1,3-octadiene, 1-phenyl-1,3-butadiene and 1,3-hexadiene, and of monoalkenyl arenes, the latter selected from styrene, ortho-methylstyrene, para-methylstyrene, meta-methylstyrene, tert-butylstyrene and monovinylnaphthalene. Styrene is the preferred monoalkenyl arene. Preferred hydrogenated copolymers of conjugated dienes and monoalkenyl arenes are hydrogenated butadiene-styrene and isoprene-styrene copolymers.

Preferred polymer segments are hydrogenated copolymers of butadiene and styrene or hydrogenated copolymers of isoprene and styrene, with the hydrogenated copolymer of butadiene and styrene being still more preferred.

Calixarenes are well known cyclic compounds derived from the condensation of p-substituted phenols and formaldehyde. Ring extension in calixarenes is conventionally indicated in the nomenclature thereof by designating such products as calix[n]arenes, in which with n denotes the number of units present in the cyclic product.

The calixarenes of the invention are represented by the formula (I)

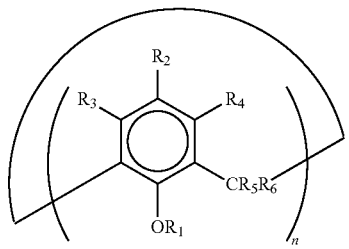

in which:

$R_1$, $R_2$, $R_3$ and $R_4$ are independently selected from hydrogen; a group containing carbon and hydrogen; a group also containing heteroatoms in addition to carbon and hydrogen; a group also containing silicon in addition to carbon, hydrogen and heteroatoms;

one of the two substituents $R_5$ and $R_6$ is hydrogen, while the other may be hydrogen or alkyl, with a number of carbon atoms between 1 and 6, preferably methyl and ethyl;

n is an integer in the range between 4 and 16, preferably between 6 and 12 and more preferably 8.

In the text, heteroatoms are taken to mean atoms of oxygen, nitrogen, phosphorus, sulfur and halogens.

The number P of linear hydrogenated segments is between 4 and 72, preferably between 16 and 48.

More preferably, P=j*n, where j is the number of polymer segments which each phenolic unit can link and is an integer between 1 and 6.

Preferably, $R_1$ and $R_2$ may be selected from:

an alkyl having a number of carbon atoms between 1 and 24, preferably between 2 and 12; or a group also containing heteroatoms in addition to carbon and hydrogen and having a number of carbon atoms between 1 and 16; in this case, preferred heteroatoms are oxygen and halogen; or a group also containing silicon in addition to carbon, hydrogen and heteroatoms, in which the number of carbon atoms varies between 5 and 21; preferred among these groups are alkoxyalkylsilane and haloalkylsilane groups with a number of carbon atoms between 5 and 21; or an unsaturated hydrocarbon group, with or without heteroatoms, having a number of carbon atoms between 2 and 16, preferably a group of the vinyl, allyl or acryloyl type, more preferably of the vinyl type.

$R_3$, $R_4$, $R_5$ and $R_6$ are preferably simultaneously hydrogen.

$R_1$ may more preferably be selected from:

a group of the formula (II) containing a halogen:

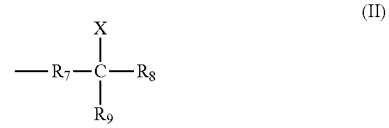

in which X is halogen, preferably selected from Cl, Br and I; $R_7$ is an alkylene or alkenyl group with a number of carbon atoms between 1 and 12, preferably between 1 and 6, or arylalkylene with a number of carbon atoms between 7 and 18; $R_8$ and $R_9$ are hydrogen or an alkyl or alkenyl group with a number of carbon atoms between 1 and 12, hydrogen being preferred;

a group of the formula (III) containing an ester type functionality:

in which $R_{10}$ is an alkylene or alkenyl group with a number of carbon atoms between 1 and 12, preferably between 1 and 6, or arylalkylene with a number of carbon atoms between 7 and 18; $R_{11}$ is an alkyl group with a number of carbon atoms between 1 and 6, preferably methyl and ethyl;

a group of the formula (IV) containing functionality of the ketone or aldehyde type:

where $R_{12}$ is an alkylene or alkenyl group with a number of carbon atoms between 1 and 12, preferably between 1 and 6, or arylalkylene with a number of carbon atoms between 7 and 18; $R_{13}$ is hydrogen or an alkyl or alkenyl group with a number of carbon atoms between 1 and 12, preferably between 1 and 6, or arylalkyl with a number of carbon atoms between 7 and 18;

a group of the formula (V):

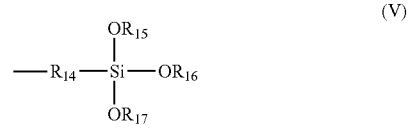

where $R_{14}$ is an alkylene or alkenyl group with a number of carbon atoms between 1 and 12, preferably between 1 and 6, or arylalkylene with a number of carbon atoms between 7 and 18, $R_{15}$, $R_{16}$, $R_{17}$, are independently an alkyl group with a number of carbon atoms between 1 and 8, preferably methyl and ethyl.

$R_1$ may still more preferably be selected from:

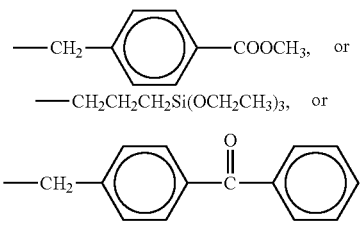

$R_1$ is still more preferably selected from:

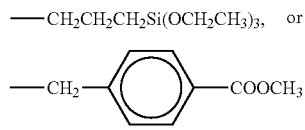

$R_2$ is more preferably selected from:
an alkyl having a number of carbon atoms between 1 and 12, preferably —C(CH$_3$)$_3$, —C(CH$_3$)$_2$CH$_2$C(CH$_3$)$_3$;
a haloalkyl having a number of carbon atoms between 1 and 8, preferably the group —CH$_2$Cl;
an alkoxycarbonyl having a number of carbon atoms between 2 and 6, preferably the groups —COOCHH$_3$ and —COOC$_2$H$_5$;
a group with the formula (V) in which R$_{14}$, R$_{15}$, R$_{16}$ and R$_{17}$ have the meanings mentioned above;
an alkoxybenzoate group with the formula (VI):

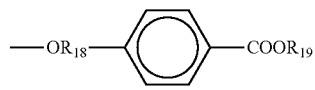

(VI)

in which R$_{18}$ is an alkylene group with a number of carbon atoms between 1 and 6, preferably methylene and R$_{19}$ is an alkyl group with a number of carbon atoms between 1 and 6, preferably methyl and ethyl.

$R_2$ is still more preferably selected from:
—C(CH$_3$)$_3$; —CH$_2$Cl; —COOCH$_3$; —CH$_2$CH$_2$CH$_2$Si(OCH$_2$CH$_3$)$_3$.

Preferred hydrogenated radial polymers have a core made up of calixarenes of the formula (I) in which:
R$_1$, R$_2$, R$_3$ and R$_4$ are independently selected from hydrogen; a group containing carbon and hydrogen; a group also containing heteroatoms in addition to carbon and hydrogen; a group also containing silicon in addition to carbon, hydrogen and heteroatoms;
one of the two substituents R$_5$ and R$_6$ is hydrogen, while the other may be hydrogen or alkyl, with a number of carbon atoms between 1 and 6, preferably methyl and ethyl;
n is an integer in the range between 4 and 16, preferably between 6 and 12 and more preferably 8,
and the hydrogenated linear polymer segments are hydrogenated copolymers of butadiene and styrene, or of isoprene and styrene, or hydrogenated homopolymers or hydrogenated copolymers of butadiene and isoprene.

Preferred hydrogenated radial polymers have a core made up of calixarenes of the formula (I) in which:
R$_1$, R$_2$ are independently selected from hydrogen; a group containing carbon and hydrogen; a group also containing heteroatoms in addition to carbon and hydrogen; a group also containing silicon in addition to carbon, hydrogen and heteroatoms;
R$_3$, R$_4$, R$_5$ and R$_6$ are simultaneously hydrogen;
n is an integer in the range between 4 and 16, preferably between 6 and 12 and more preferably 8,
and the hydrogenated linear polymer segments are hydrogenated copolymers of butadiene and styrene, or of isoprene and styrene.

More preferred hydrogenated radial polymers have a core made up of calixarenes of the formula (I) in which:
R$_1$ is selected from substituents of the formula (II), (Ill), (IV) and (V),
R$_2$ is selected from:
an alkyl having a number of carbon atoms between 1 and 12, preferably —C(CH$_3$)$_3$, —C(CH$_3$)$_2$CH$_2$C(CH$_3$)$_3$;
a haloalkyl having a number of carbon atoms between 1 and 8, preferably the group —CH$_2$Cl;
an alkoxycarbonyl having a number of carbon atoms between 2 and 6, preferably the groups —COOCH$_3$ and —COOCH$_2$H$_5$;
an alkylenetrialkoxysilane group with the formula (V) in which R$_{14}$, R$_{15}$, R$_{16}$ and R$_{17}$ have the meanings mentioned above;
an alkoxybenzoate group with the formula (VI);
R$_3$, R$_4$, R$_5$ and R$_6$ are simultaneously hydrogen;
n is an integer in the range between 4 and 16, preferably between 6 and 12 and more preferably 8,
and the hydrogenated linear polymer segments are hydrogenated copolymers of butadiene and styrene, or of isoprene and styrene.

The radial polymers still more preferably have a core made up of calixarenes of the formula (I) in which:
R$_1$ is selected from:

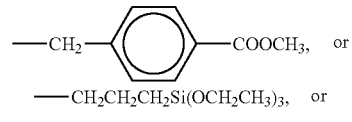

R$_2$ is selected from: —C(CH$_3$)$_3$; —CH$_2$Cl; —COOCH$_3$; —CH$_2$CH$_2$CH$_2$Si(OCH$_2$CH$_3$)$_3$;
R$_3$, R$_4$, R$_5$ and R$_6$ are simultaneously hydrogen;
n is an integer in the range between 4 and 16, preferably between 6 and 12 and more preferably 8,
and the hydrogenated linear polymer segments are hydrogenated copolymers of butadiene and styrene, or of isoprene and styrene.

The radial polymers more preferably have a core made up of calixarenes of the formula (I) selected from: 5,11,17,23,29,35,41,47-octa-chloromethyl-49,50,51,52,53,54,55,56-octa-hexyloxy-calix[8]arene; 5,11,17,23,29,35,41,47-octa-tert-butyl-49,50,51,52,53,54,55,56-octa-[4-(methoxycarbonyl)-benzyloxy]calix[8]arene; 5,11,17,23,29,35,41,47-octa-tert-butyl-49,50,51,52,53,54,55,56-octa-(3-triethoxysilylpropoxy)calix[8]arene; 5,11,17,23,29,35,41,47-octa-methoxycarbonyl-49,50,51,52,53,54,55,56-octa[4-(methoxycarbonyl)-benzyloxy]calix[8]arene; 5,11,17,23,29, 35,41,47-octa-(3-triethoxysilylpropyl)-49,50,51,52,53,54,
55,56-octa-(3-triethoxysilylpropoxy)calix[8]arene; and
have hydrogenated polymer segments selected from hydrogenated copolymers of butadiene and styrene, or isoprene and styrene.

The radial polymers more preferably have a core made up of calixarenes of the formula (I) selected from: 5,11,17,23, 29,35,41,47-octa-chloromethyl-49,50,51,52,53,54,55,56-octa-hexyloxy-calix[8]arene; 5,11,17,23,29,35,41,47-octa-tert-butyl-49,50,51,52,53,54,55,56-octa-[4-(methoxycarbonyl)-benzyloxy]calix[8]arene; 5,11,17,23,29, 35,41,47-octa-tert-butyl-49,50,51,52,53,54,55,56-octa-(3-triethoxysilyl-propoxy)calix[8]arene; 5,11,17,23,29,35,41, 47-octa-methoxycarbonyl-49,50,51,52,53,54,55,56-octa[4-(methoxycarbonyl)-benzyloxy]calix[8]arene; 5,11,17,23,29, 35,41,47-octa-(3-triethoxysilylpropyl)-49,50,51,52,53,54, 55,56-octa-(3-triethoxysilylpropoxy)calix[8]arene; and have hydrogenated polymer segments selected from hydrogenated homopolymers of butadiene.

Method for Synthesising the Radial Polymers Described and Claimed in the Present Patent Application.

The present invention further provides a synthesis method for the radial polymers described and claimed in the present text, which method comprises the following stages:

i. synthesising a calixarene of the general formula (I);
ii. preparing the linear polymer segments by anionic polymerisation in solution of one or more conjugated dienes, or by copolymerisation of one or more conjugated dienes and a monoalkenyl arene, in the presence of an ionic initiator to form a living anionic polymer;
iii. reacting the living anionic polymer obtained in (ii) with the calixarene synthesised in (i) to form a polymer with a radial structure; and
iv. reacting, by selective hydrogenation, the olefinic unsaturations present in the radial polymer obtained in (iii) to obtain a hydrogenated radial polymer.

The living anionic polymers produced in stage (ii) are the precursors of the hydrogenated linear polymer chains which extend radially outwards from the core of the calixarene. In a preferred embodiment of the present invention, the substituents $R_1$ and $R_2$ of the calixarene are selected such that, for each of the units n of the calix[n]arene, at least one or both of the substituents have a functionality capable of reacting with the living anionic polymer, so giving rise to the radial polymer.

The number of hydrogenated linear polymer segments P in the final radial polymer thus depends on the number n of units of the calix[n]arene, on the number of groups $R_1$ and $R_2$ reactive towards the living anionic polymer, on the number of living anionic polymer units which each of the groups $R_1$ and $R_2$ is capable of linking and on the yield of the coupling reaction between the living anionic polymers and the calixarenes.

The groups $R_1$ and $R_2$ must not contain acidic hydrogens capable of reacting with the living anionic polymer, so removing the latter from the coupling reactions with the calixarene which lead to the formation of the radial polymers.

Groups $R_1$ and $R_2$ containing an ester type functionality are capable of linking two living anionic polymer units; this is because the reaction with a first living anionic polymer unit proceeds with elimination of the alkoxide and formation of a ketone species which is in turn capable of linking a second living anionic polymer unit by means of an addition reaction, so forming the radial polymer.

Groups $R_1$ and $R_2$ containing an aldehyde or ketone type functionality are capable of linking just one living anionic polymer unit by means of an addition reaction.

Groups $R_1$ and $R_2$ containing a halogenated alkyl functionality are capable of linking one living anionic polymer unit by means of a substitution reaction.

Alkyltrialkoxysilane groups, on the other hand, are capable of linking three living anionic polymer units with elimination of the corresponding alkoxides.

Groups $R_1$ or $R_2$ which comprise an olefinic unsaturation, preferably of the vinyl, allyl or acryloyl type, can link one living anionic polymer unit by means of an addition reaction.

Stage (i): Synthesis of Calixarene Cores

The synthesis of calixarenes of the formula (I) where $R_1=R_3=R_4=H$ is well known in the prior art and is typically performed by means of condensation between phenols which are p-substituted, preferentially with alkyl groups, and formaldehyde at elevated temperature, as indicated in scheme 1 below:

Scheme 1

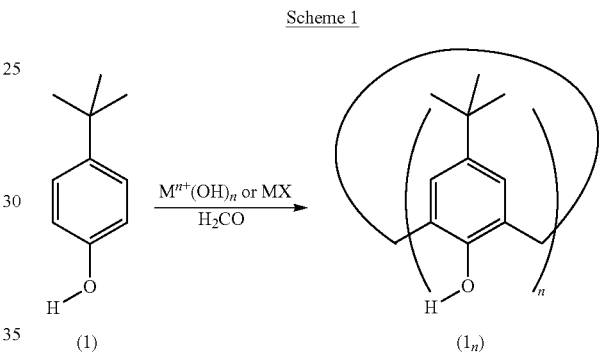

The catalysts used are usually metal hydroxides, preferentially of alkali or alkaline earth metals, as indicated, for example, in Gutsche, C. D. et al. Org. Synth. 1990, 68, 234-246. Lewis acids have also recently been used with good yields with the assistance of microwave irradiation, as indicated in Bew, S. P. et al. Chem. Commun. 2007, 975-977; Bew, S. P. et al. J. Org. Chem. 2011, 76, 7076-7083. Typically, the size of the macrocycle may conveniently be adjusted by changing the base cation, the solvent and the heating temperature. In the case of some phenols, typically p-tert-butylphenol, consolidated experimental procedures (for example in Gutsche, C. D. et al. Org. Synth. 1990, 68, 234-246 and Gutsche, C. D. Org. Prep. Proced. Int. 1992, 25, 137-139) allow synthesis to be directed with excellent yields (60-90%) to the products of the formula (I) with $R_1=R_3=R_4=H$, $R_2=$tert-$C_4H_9$ and bearing n=4, 5, 6 or 8. Typically, in order to synthesise the p-tert-butylcalix[8]arene derivative of the formula (I) with $R_1=R_3=R_4=H$, $R_2=$tert-$C_4H_9$ and n=8, the p-tert-butylphenol (1) indicated in scheme 1 and paraformaldehyde are reacted with NaOH in xylene at reflux temperature. The quantities of paraformaldehyde and NaOH used are respectively 1.7 equivalents and 0.03 equivalents per equivalent of p-tert-butylphenol. Following removal of water from the distillation head, the desired product may be isolated by filtration after 4 hours' reaction as a cyclic octameric derivative ($1_n$) with n=8, indicated in scheme 1.

For the purposes of the present invention, calixarenes with free hydroxyl groups, such as for example ($1_n$), are functionalised at the lower rim ($R_1$ of the formula (I)) and/or at the upper rim ($R_2$ of the formula (I)) with groups containing functionalities capable of linking living anionic polymer units. Functionalities of the ketone, aldehyde and haloalkyl type are capable of linking at most one living anionic polymer unit; functionalities of the ester type are capable of linking at most two living anionic polymer units; alkyltrialkoxysilane groups are capable of linking at most three living anionic polymer units.

The general methods for preparing the preferred calixarenes of the invention are indicated below by way of example.

Stage (i) (Synthesis of Calixarene Cores): Synthesis of Calixarene Derivatives to which One Polymer Segment May be Added for Each Phenolic Core.

Calixarene derivatives containing chloromethyl groups on the upper rim of each phenolic unit were prepared by following a procedure comprising the reactions indicated in scheme 2 below.

Scheme 2

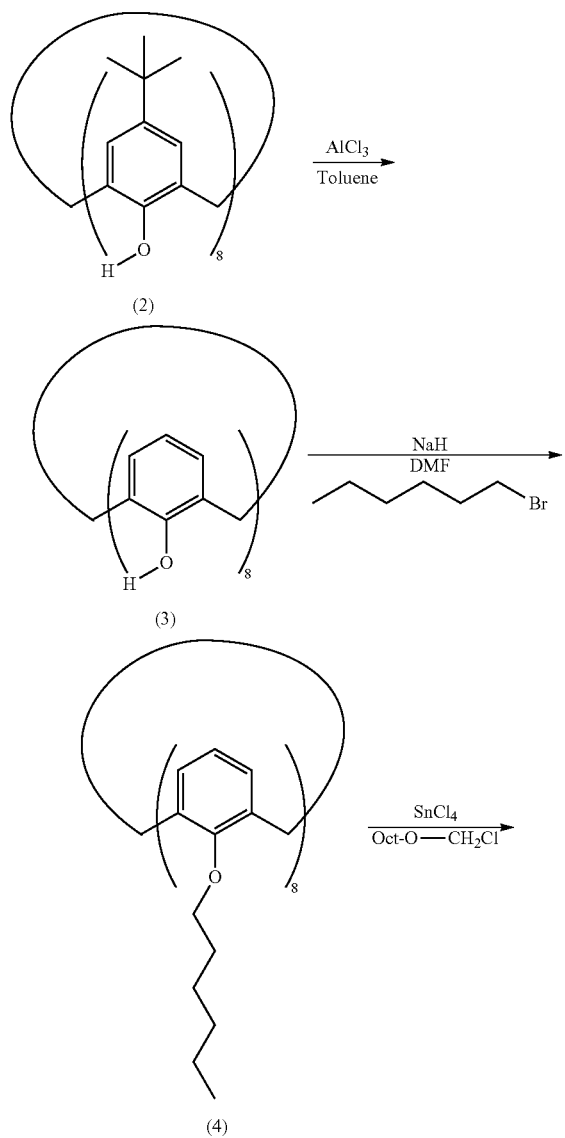

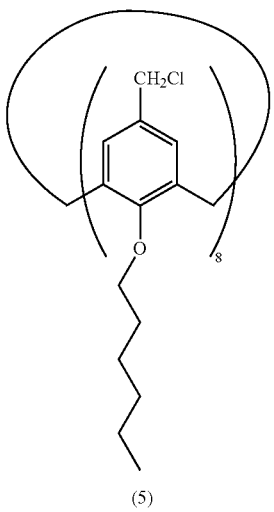

The tert-butyl groups may readily be removed from the p-tert-butylcalix[n]arenes by using $AlCl_3$ in toluene, as is well known in the literature (Gutsche, C. D. et al. J. Org. Chem., 1985, 50, 5802-5806).

Treating p-tert-butylcalix[8]arene (2) with $AlCl_3$ (0.25 equiv. for each phenolic core) for 2 hours at 60° C. under an inert atmosphere yields the derivative (3), so enabling functionalisation of the upper rim (para position relative to the phenolic oxygen) of the calixarenes.

Alkylating (3) with 1-bromohexane (5 equiv. for each phenolic core) and NaH (10 equiv. for each phenolic core) in anhydrous DMF (Perret et al. New J. Chem., 2007, 31, 893-900) allows isolation of the derivative (4) which, according to the literature (Casnati, A. et al. Tetrahedron 1989, 45, 2177-2182), reacts in $CHCl_3$ with chloromethyl octyl ether (10 equiv. for each phenolic core) and tin tetrachloride (4 equiv. for each phenolic core), so leading to the formation of compound (5) (90% yield).

Stage (i) (Synthesis of Calixarene Cores): Synthesis of Calixarene Derivatives to which Two Polymer Segments May be Added for Each Phenolic Core.

Calixarene derivatives with ester type functionality are prepared by alkylating calixarene (2) on the phenolic oxygens by reaction with halo esters, preferably with 4-(bromomethyl)methyl benzoate and potassium carbonate in acetone at reflux temperature according to scheme 3 below. The quantity of 4-(bromomethyl)methyl benzoate used is between 1 and 1.5 equivalents per equivalent of p-tert-butylphenol and that of potassium carbonates is between 1.1 and 2 equivalents per equivalent of p-tert-butylphenol. The octafunctionalised product (6) obtained according to scheme 3, is isolated and, after appropriate dehydration, used in the reaction with living anionic polymers.

Scheme 3

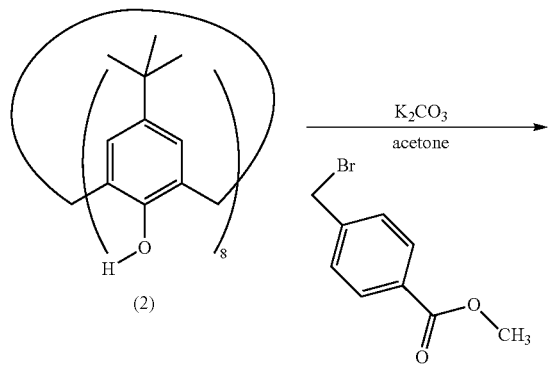

(2)

(6)

Scheme 4

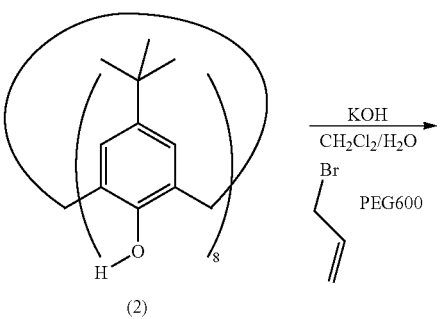

(2)

(7)

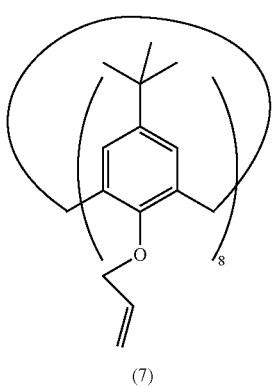

(8)

Stage (i) (Synthesis of Calixarene Cores): Synthesis of Calixarene Derivatives to which Three Polymer Segments May be Added for Each Phenolic Core.

An alternative product to be used as a core in the reactions with the living anionic polymer is derivative (8), obtained according to scheme 4 indicated below. In order to obtain said product, the p-tert-butylcalix[8]arene (2), of the formula (I), with $R_1=R_3=R_4=H$, $R_2=$tert-$C_4H_9$ and n=8, is reacted under phase-transfer conditions with KOH (1.5 equiv. for each phenolic core), allyl bromide (3 equiv. for each phenolic core) in a 1:1 mixture of water and dichloromethane and in the presence of polyethylene glycol with an average molecular weight of 600 (PEG 600) according to the literature (Wang et al. Synthetic Communications 1999, 29, 3711-3718). After isolation, the resultant octa-allyl ether of p-tert-butylcalix[8]arene (7) is reacted with triethoxysilane (1.5 equiv. for each phenolic core) and hexachloroplatinic acid hexahydrate (catalytic quantity) in toluene at reflux temperature for 16 hours. After filtration and removal of the toluene and excess triethoxysilane, the derivative (8) is isolated.

Stage (i) (Synthesis of Calixarene Cores): Synthesis of Derivatives to which 4 Polymer Segments (2 to the Upper Rim and 2 to the Lower Rim) May be Added for Each Phenolic Core.

Calixarene derivatives containing ester groups on both the lower and the upper rim of each phenolic unit were prepared by following a procedure comprising the reactions indicated in scheme 5 below.

Scheme 5

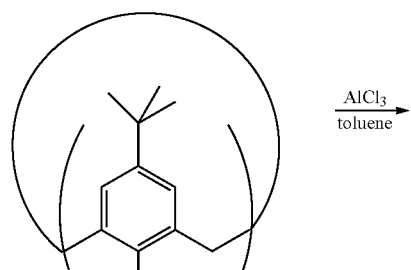
(2)

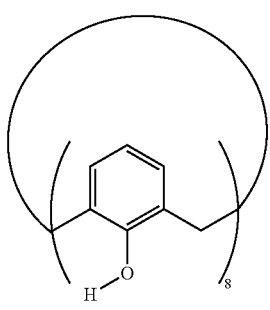
(3)

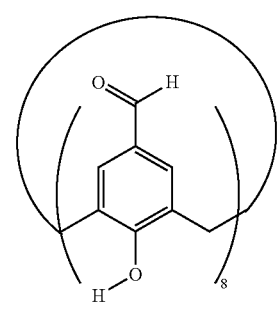
(9)

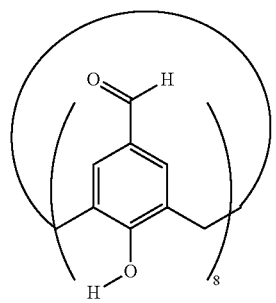
(9)

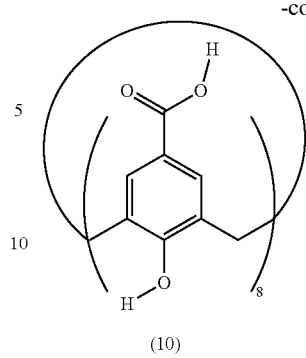
(10)

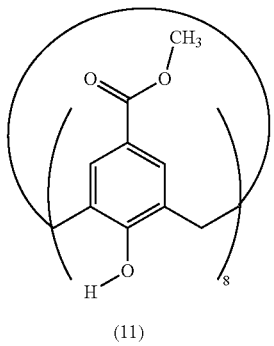
(11)

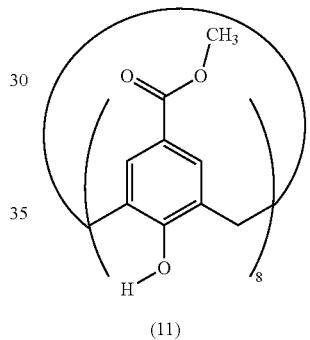
(11)

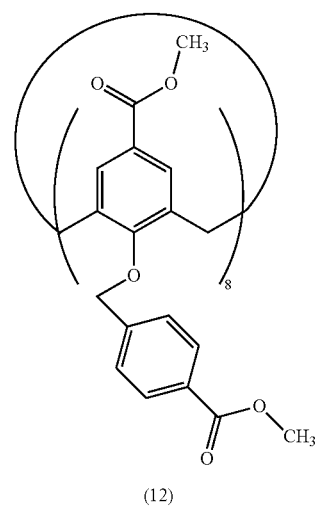
(12)

Treating p-tert-butylcalix[8]arene with $AlCl_3$ (0.25 equiv. for each phenolic core) for 2 hours at 60° C. under an inert atmosphere yields the derivative (3) which, as a result of subsequent treatment with hexamethylenetetramine (HMTA, 11 equiv. for each phenolic core) in trifluoroacetic acid (8 equiv. for each phenolic core) at 140° C. for 5 hours, leads to the formyl group being introduced and compound (9) being obtained, as stated in the literature (Pasquale, S. et al. Nat. Commun., 2012, 3, 785). Following subsequent oxidation of compound 9 with NaClO$_2$ (4 equiv. for each phenolic core) and NaH$_2$PO$_4$ (0.15 equiv. for each phenolic core), the octaacid (10) is obtained which, once methylated under conventional Fischer esterification conditions, yields the octaester (11). Alkylating the latter with 4-bromomethylmethyl benzoate and K$_2$CO$_3$ in acetone at reflux temperature allows isolation of the derivative (12) which has ester groups on both the upper and the lower rim and allows the insertion of 4 polymer chains per phenolic core of the macrocycle.

Stage (I) (Synthesis of Calixarene Cores): Synthesis of Derivatives to which 6 Polymer Segments (3 to the Upper Rim and 3 to the Lower Rim) May be Added for Each Phenolic Core.

As shown in scheme 6 below, compound (13) is obtained starting from derivative (3) and inserting the allyl groups on the lower rim following alkylation under phase-transfer conditions (PEG 600), with allyl bromide (3 equiv. for each phenolic core), in the presence of KOH (1.5 equiv. for each phenolic core) and in dichloromethane/water as solvent.

After treatment with N,N-diethylaniline (12 equiv. for each phenolic core), derivative (13) gives rise to derivative (14) following Fries transposition, which is also well known on calixarenes (Gutsche, C. D. et al. J. Org. Chem., 1985, 50, 5802-5806). Compound (14), after being reacted under the above-described phase-transfer conditions with KOH and allyl bromide, allows isolation of the hexadecaallyl derivative (15). Subsequent treatment with hexachloroplatinic acid (catalytic quantities) and triethoxysilane (1.5 equiv. for each allyl residue) in toluene at reflux temperature for 16 hours yields the derivative (16).

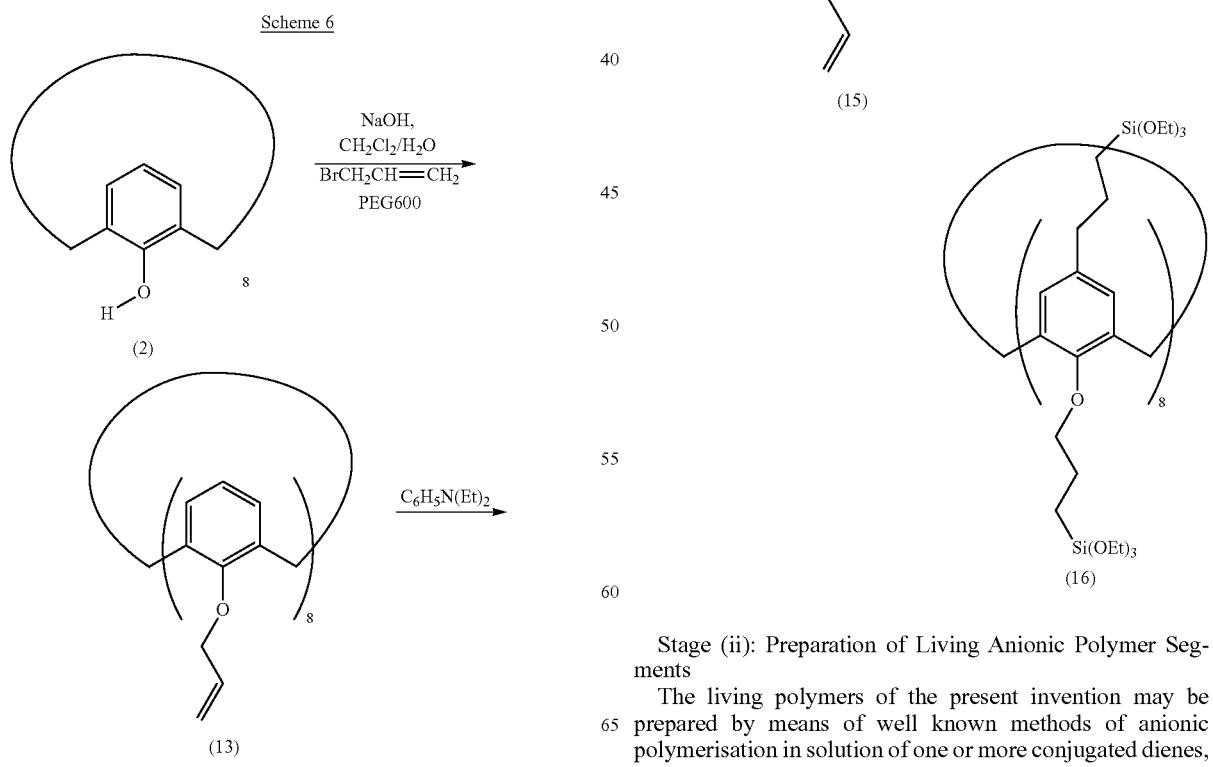

Scheme 6

Stage (ii): Preparation of Living Anionic Polymer Segments

The living polymers of the present invention may be prepared by means of well known methods of anionic polymerisation in solution of one or more conjugated dienes, or copolymerisation of one or more conjugated dienes and one or more monoalkenyl arenes in the presence of an anionic polymerisation initiator, such as, for example, an alkali metal-hydrocarbon compound. Examples of initiators include organic lithium compounds, such as alkyllithium compounds, in particular methyllithium, n-butyllithium, sec-butyllithium, cycloalkyllithium compounds, in particular cyclohexyllithium and aryllithium compounds, in particular phenyllithium, 1-methylstyryllithium, p-tolyllithium, naphthyl-lithium and 1,1-diphenyl-3-methylpentyllithium. Other examples of initiators include sodium naphthalene, 1,4-disodio-1,1,4,4-tetraphenylbutane, diphenylmethylpotassium and diphenylmethylsodium.

Examples of conjugated dienes which are suitable for use in the preparation of the living polymer include butadiene; isoprene; 1,3-pentadiene; 2,3-dimethyl-1,3-butadiene; 3-butyl-1,3-octadiene; 1-phenyl-1,3-butadiene; 1,3-hexadiene. Butadiene and isoprene are the preferred dienes.

The concentration of the initiator used is determined by the desired molecular weight of the living polymer.

Apart from being derived from one or more conjugated dienes, the living polymer may also be derived from one or more monoalkenyl arenes. Examples of monoalkenyl arenes include styrene, ortho-methylstyrene, para-methylstyrene, meta-methylstyrene, tert-butylstyrene and monovinylnaphthalene. Styrene is the preferred monoalkenyl arene. If the monoalkenyl arenes are used in the preparation of the living polymer, the quantity thereof is between 2% by weight and 50% by weight relative to the total weight of the sum of the dienes and the monoalkenyl arenes.

The living polymers may be living homopolymers, living copolymers, living terpolymers or living quaterpolymers.

The living homopolymers may be represented by the formula A-M, in which M is for example lithium and A is for example polybutadiene or polyisoprene.

The living copolymers may be represented by the formula A-B-M in which M is for example lithium and A-B may be a "random" copolymer, or a block copolymer, or alternatively a "tapered" copolymer. In the case of random copolymers, the two monomers follow one another along the chain without any order. Said type of polymers may be obtained by using polymerisation methods known in the prior art. In the case of block copolymers, a sequence of greater or lesser length formed by monomer A is followed by another formed by monomer B.

Such types of polymers are prepared by successive additions of the two monomers to the reaction. For example, in the case of styrene-butadiene copolymers, polymerisation of butadiene results in a living polymer which, following subsequent addition of styrene, forms a polybutadiene-polystyrene-M block copolymer. Conversely, if the styrene is polymerised first and the butadiene is added subsequently, a polystyrene-polybutadiene-M block copolymer is formed. Using this approach, it is possible to obtain a living polymer with the desired number of blocks and the desired sequence of monomer blocks.

By combining the above-stated approaches it is possible to form a living copolymer with a partially "random" and partially block structure.

"Tapered" living copolymers, which are formed when a mixture of two monomers of differing reactivities is polymerised, are characterised by a polymer chain which contains the two relatively pure monomers at the two ends. Moving from one end to the other of the polymer chain, there is a reduction in content of the first monomer and an increase in the content of the second monomer.

Preferred living polymers are those arising from the copolymerisation of a conjugated diene, preferably butadiene or isoprene, with a monoalkenyl arene, preferably styrene, characterised by a monoalkenyl arene content between 3% by weight and 30% by weight relative to the total weight of the copolymer, and a diene content between 97% by weight and 70% by weight relative to the total weight of the copolymer. Still more preferred are those living polymers arising from the copolymerisation of butadiene and styrene characterised by a styrene content between 5% by weight and 25% by weight relative to the total weight of the copolymer and a butadiene content between 95% by weight and 75% by weight relative to the total weight of the copolymer. The preference for living copolymers derived from the copolymerisation of butadiene and styrene is dictated by costs, commercial availability and ease of use of the raw materials.

In a further preferred embodiment of the present invention, copolymerisation is carried out in the presence of modifying agents, in particular ethers and/or amines, the primary purpose of which is to promote polymerisation, to randomise copolymerisation and to modify the microstructure of the polydiene segment. In particular, as indicated in international patent application WO 2012/055802, when butadiene is used, the modifying agents have the purpose of increasing the 1,2 linkage content of the conjugated diene relative to the 1,4 linkage content. This is because it is preferred for the polymer derived from 1,2 linkage of the butadiene to make up more than 50% of the total polybutadiene. Butadiene 1,2 linkage contents of less than 50% result in the formation, after hydrogenation of the olefinic unsaturations, of a crystalline polymer which is not desired because it impairs the low-temperature behaviour of the star polymer when used as an additive for modifying the viscosity index of lubricating oils. This is because crystallinity of the final polymer has a negative impact on the pour point and MRV (mini-rotary viscometer) viscosity of the lubricating oil. Examples of modifying agents include diethylene glycol dimethyl ether, diethylene glycol diethyl ether, diethylene glycol dibutyl ether, triethylene glycol dimethyl ether, triethylene glycol diethyl ether, tetrahydrofuran, 2-methoxyethyltetrahydrofuran, 2-methoxymethyltetrahydrofuran and dioxane.

The copolymerisation process is carried out in the presence of at least one inert solvent. Examples of solvents which may be used include aliphatic hydrocarbons, such as for example isobutanol, pentane, cyclopentane, hexane, cyclohexane, heptane, methylcyclohexane, octane and 2-ethylhexane; aromatic hydrocarbons, such as for example benzene, toluene, ethylbenzene and xylene; ethers, such as for example tetrahydrofuran, diglyme and tetraglyme.

The temperature at which copolymerisation may be carried out is between 0° C. and 150° C., preferably between 20° C. and 100° C.

The copolymerisation process is carried out in the absence of oxygen and moisture, preferably under an inert atmosphere, at an absolute pressure between 0.5 and 10 atm, preferably a pressure between 1 and 5 atm.

The weight-average molecular weight ($M_W$), determined by GPC, of the living polymers prepared in stage (ii) of the process for preparing the star polymers is between 10000 and 200000, preferably between 14000 and 100000.

Stage (iii): Coupling Reaction of Living Anionic Polymers with Calixarenes

Once produced, the living polymers are reacted in reaction stage (iii) of the method for preparing the radial polymers described and claimed in the present text, with the calixarenes produced in reaction stage (i). The calixarene is added to the living polymer once polymerisation of the monomers in stage (ii) is complete.

The quantity of calixarene in mol which is added depends on the number of linear polymer segments which the calixarene can link. The quantity of calixarene is between 0.8/P mol and 1.2/P mol per mol of living polymer, more preferably between 0.9/P mol and 1.1/P mol.

Reaction stage (iii) is carried out in the presence of at least one inert solvent. Examples of solvents which may be used include aliphatic hydrocarbons, such as for example isobutanol, pentane, cyclopentane, hexane, cyclohexane, heptane, methylcyclohexane, octane and 2-ethylhexane; aromatic hydrocarbons, such as for example benzene, toluene, ethylbenzene and xylene; ethers, such as for example tetrahydrofuran, diglyme and tetraglyme.

Reaction stage (iii) is preferably carried out in the same solvent used in reaction stage (ii), at a temperature between 0° C. and 150° C., preferably between 20° C. and 100° C. The reaction is carried out in the absence of oxygen and moisture, preferably under an inert atmosphere, at atmospheric pressure or alternatively at an absolute pressure between 0.5 and 10 atm, preferably between 1 and 5 atm.

The yield of the coupling reaction between the living anionic polymers and the calixarenes is greater than 50%, preferably greater than 80%.

If the polymer with a radial structure of reaction stage (iii) is in anionic form, it may be deactivated using known procedures by addition of a compound capable of reacting with the anion. Examples of deactivators include compounds comprising active hydrogen such as water and alcohols.

The radial polymer prepared in reaction stage (iii) is characterised by having a central core made up of the calixarene to which are radially linked a number P of polymer segments which extend outwards from the core. The larger is the number of polymer segments linked to the calixarene, the better is the thickening power. At identical thickening power, the larger is the number of polymer segments, the better is mechanical shear stability because it is possible in this manner to have a high molecular weight radial polymer without there being any need to have excessively long polymer segments.

Stage (iv): Hydrogenation of the Star Polymer

The star polymer produced in reaction stage (iii) is hydrogenated in such a manner that the degree of hydrogenation of the initially present olefinic unsaturations is greater than 85%, preferably greater than 94%.

The hydrogenation catalyst and hydrogenation conditions used make it possible for the quantity of aromatic unsaturations which are hydrogenated in the calixarene and in the monoalkenyl arene, when used, to be less than 5%, more preferably less than 2%. Hydrogenation may be carried out using known catalysts containing either noble metals or non-noble metals. Preference is given to catalysts based on non-noble metals and in particular the catalysts containing titanium mentioned in European patent EP 1721910 are preferred.

The hydrogenated star polymer is then recovered from the solution by means of a series of operations including removal of the solvent and drying.

The weight-average molecular weight ($M_w$) of each of the hydrogenated linear polymer segments which make up the hydrogenated star polymer is between 10000 and 200000, preferably between 14000 and 100000.

The weight-average molecular weight ($M_w$) of the hydrogenated star polymers provided by the present invention is between 100000 and 2000000, preferably between 200000 and 1000000.

Average molecular weights are determined by gel permeation chromatography (GPC) with a UV detector using polystyrene as calibration standard.

Use of the Hydrogenated Star Polymers in Lubricant Formulations

The hydrogenated star polymers provided by the present invention may be used as viscosity index-improver additives in lubricant compositions.

For formulation of the lubricants, said hydrogenated star polymers may be added as such in the form of solids, or they may be in solution, preferably in solution with a lubricant base oil.

The base oils used as solvents for dissolving the hydrogenated star polymers are selected from base oils of a mineral, synthetic, vegetable or animal origin and mixtures thereof.

Oils of mineral origin are derived from known petroleum refining processes, such as for example distillation, deparaffination, deasphaltation, dearomatisation and hydrogenation. Oils of synthetic origin include hydrocarbons oils, such as for example polymerised and hydrogenated terminal or internal olefins; alkylbenzenes; polyphenyls; alkylated diphenyl ethers; polyalkylene glycols and derivatives in which the terminal hydroxyl groups have been modified, for example by esterification or etherification.

Another class of synthetic lubricating oils comprises esters of synthetic or animal or vegetable-derived carboxylic acids with a variety of alcohols or polyols.

A further class of synthetic lubricating oils comprises carbonic acid esters with a variety of alcohols and polyols.

Typical examples of vegetable oils are soy, palm or castor oil, while examples of oils of origin animal are tallow oil, lard oil or whale oil.

Another way of classifying base oils is that set out by the American Petroleum Institute (API) in the publication "Engine Oil Licensing and Certification System" (API EOLCS, 1507—Industry Services Department, Fourteenth Edition, December 1996, Addendum 1, December 1998). Base oils are subdivided into five groups as a function of their physicochemical and compositional characteristics.

According to this classification, the base oils used for dissolving the star polymers may belong to any of the above-stated API groups, preferably to API groups I, II, III and IV and still more preferably to API groups I, II and III.

The viscosity index-improver additives, obtained by dissolving the hydrogenated star polymers in base oils, have a polymer concentration, expressed as a percentage by weight of the polymer in the solution made up of the polymer and base oil, between 1 and 30, preferably between 5 and 25.

The present invention further provides lubricant compositions, also designated lubricant formulations, containing one or more of one of the lubricant base oils previously described and one or more of the hydrogenated star polymers described and claimed in the present patent application, used at a total concentration, expressed as a percentage by weight of the polymer in the finished lubricant oil, between 0.1 and 5, preferably between 0.3 and 2.

Where solutions of the star polymers in base oils are used to formulate lubricants, the lubricant compositions provided by the invention contain one or more of said solutions at a total concentration, expressed as a percentage by weight of the solution in the finished lubricant oil, between 0.5 and 50, preferably between 3.5 and 30, more preferably between 5 and 18.

Such lubricant compositions, used for example as automotive oils, may contain, in addition to the above-stated additives, one or more additives selected from detergent additives, dispersant additives, antioxidant additives, friction-modifier additives, antiwear and extreme pressure (EP) additives, corrosion inhibitors, pour point-depressant additives, foam inhibitors, emulsifiers and others.

Some illustrative, non-limiting examples of the invention are provided below for the purpose of elucidating the present invention.

Example 1: Synthesis of the Calixarene of the Formula (5)

A calix[8]arene derivative which may be used according to a preferred embodiment of the present invention for synthesising star polymers is 5,11,17,23,29,35,41,47-octa-chloromethyl-49,50,51,52,53,54,55,56-octa-hexyloxy-calix[8]arene which may be represented by the structure (5):

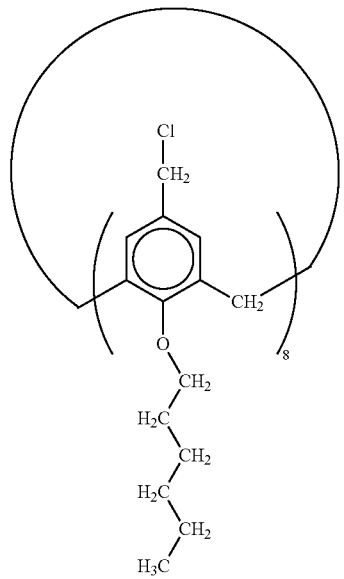

(5)

111.2 g (0.72 mol) of tert-butylphenol (1), 27 g (1.2 mol) of p-formaldehyde, 1.6 mL (0.016 mol) of 10 N NaOH and 600 mL of xylene are introduced under an inert atmosphere into a 1 L, 3-necked glass flask equipped with a mechanical paddle stirrer and "Dean and Stark" collector fitted with a condenser. The mixture is adjusted to reflux while being stirred and maintained under such conditions for 4 hours, during which the water of reaction is collected in the "Dean and Stark" collector.

After cooling to room temperature, the mixture is filtered and the solid product is washed in succession with toluene, ether, acetone and water. Once dried, the product is recrystallised from chloroform. 65.8 g (yield 70.4%) of solid white product are recovered.

The purity of the product p-tert-butylcalix[8]arene (2) is verified by ESI mass spectrometry, which reveals a single monodisperse signal.

8.25 g (6.36 mmol) of p-tert-butylcalix[8]arene (2), 1.70 g (12.7 mmol) of anhydrous aluminium trichloride, 10 mL of phenol and 100 mL of toluene are introduced under an inert atmosphere into a 250 mL, 3-necked glass flask fitted with a mechanical stirrer and condenser. The mixture is adjusted, while being stirred, to a temperature of 60° C. and kept under such conditions for 2 hours. 100 mL (100 mmol) of 1N HCl are added, the mixture is stirred and then transferred into a separating funnel, where the solvent is removed under reduced pressure from the separated organic phase, resulting in a white solid. Once dried, the product is recrystallised from chloroform/methanol.

4.10 g (yield 76%) of the product calix[8]arene (3) are obtained.

4.10 g (4.83 mmol) of calix[8]arene (3), 15.46 g (386.4 mmol) of NaH 60% in mineral oil and 50 mL of anhydrous DMF are introduced under an inert atmosphere into a 100 mL 3-necked glass flask fitted with a stirrer, thermometer and condenser. The mixture is left to react at room temperature for 30 min under an inert atmosphere.

27.12 mL (193.2 mmol) of 1-bromohexane are subsequently added.

The mixture is adjusted to 70° C. for 24 hours under an inert atmosphere.

After cooling to room temperature, 10 mL (100 mmol) of 1N HCl are added, the mixture is stirred and transferred into in a separating funnel where the organic phase is extracted with toluene, separating it from the aqueous phase.

The solvent is removed under reduced pressure, resulting in a white solid.

Once dried, the product is recrystallised from methanol.

7.41 g (yield 80%) of the product 49,50,51,52,53,54,55, 56-octa-hexyloxy-calix[8]arene (4) are obtained.

7.41 g (3.87 mmol) of 49,50,51,52,53,54,55,56-octa-hexyloxy-calix[8]arene (4), 54.7 g (306 mmol) of chloromethyl octyl ether, and 500 mL of chloroform are introduced under an inert atmosphere into a 1 L, 3-necked glass flask fitted with a mechanical paddle stirrer, thermometer and condenser. The mixture is adjusted to −15° C. while being stirred and 14 mL (120 mmol) of tin tetrachloride are added dropwise with stirring under an inert atmosphere.

The mixture is reacted for 1 hour with stirring under an inert atmosphere and at room temperature. 50 mL of distilled water are added dropwise, the mixture is stirred and the aqueous phase separated in a separating funnel. The organic phase is washed with distilled water and the solvent is subsequently removed under reduced pressure. Once dried, the product is recrystallised from heptane. 8.02 g (yield 90%) of the product 5,11,17,23,29,35,41,47-octa-chloromethyl-49,50,51,52,53,54,55,56-octa-hexyloxy-calix[8]arene (5) are obtained.

Example 2: Preparation of the Hydrogenated Isoprene-Styrene Star Polymer from the Calixarene of the Formula (5)

8 kg of anhydrous cyclohexane are introduced under an inert gas atmosphere (0.5 bar, $N_2$) into a 15 litre reactor equipped with a heating jacket and stirrer. 47 g of styrene and 1.2 g of tetrahydrofuran are then added. The solution is then thermostated to 40° C. Once said temperature has been reached, 0.49 g of n-butyllithium in a cyclohexane solution (7.65 mmol) are added. After 20 minutes, once styrene conversion is complete, 423 g of isoprene are added. After 30 minutes, once isoprene conversion is complete, 1.83 g (0.956 mmol) of the calixarene of the formula (5) are added in a tetrahydrofuran solution. The reaction mixture is then maintained at a temperature of 40° C. for 1 h.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The solution is then placed under hydrogen pressure (15 bar) and maintained at a temperature of 120° C. for 1 h and 30 minutes while being stirred. The solution is then transferred into a tank, has antioxidants (2.6 g of Irganox 565 and 17 g of Irgafos 168) added and is subsequently transferred into a stripping system in which the solvent is removed by steam; the resultant granular product is then dried in a vacuum oven.

The characteristics of the resultant hydrogenated star polymer are shown in Table 1.

Example 3: Synthesis of the Calixarene of the Formula (6)

A calix[8]arene derivative which may be used according to a further preferred embodiment of the present invention for synthesising star polymers is 5,11,17,23,29,35,41,47-octa-tert-butyl-49,50,51,52,53,54,55,56-octa-[4-(methoxycarbonyl)-benzyloxy]calix[8]arene which may be represented by the structure (6):

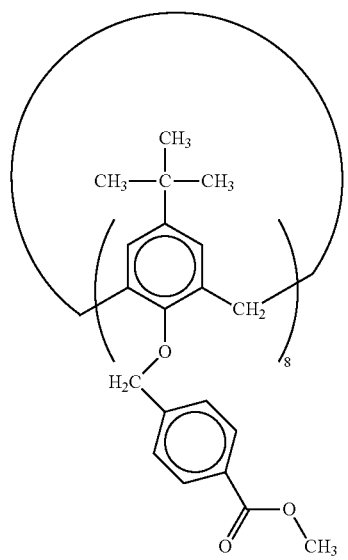

(6)

8.25 g (6.36 mmol) of p-tert-butylcalix[8]arene (2), the synthesis of which is described in Example 1, 16.45 g (71.8 mmol) of 4-(bromomethyl)methyl benzoate, 5.14 g (30.9 mmol) of KI, 13.26 g (30.9 mmol) of $K_2CO_3$ and 100 mL of acetone are introduced under an inert atmosphere into a 250 mL 3-necked glass flask fitted with a mechanical paddle stirrer, thermometer and condenser. The mixture is adjusted to reflux while being stirred and maintained under such conditions for 48 hours.

After cooling to room temperature, 100 mL (100 mmol) of 1N HCl are added, the mixture is stirred and extracted in a separating funnel with toluene, separating the organic phase from the aqueous phase. The solvent is removed from the organic phase under reduced pressure, resulting in a white solid.

Once dried, the product is recrystallised from methanol.

8.10 g (yield 51.3%) of the product 5,11,17,23,29,35,41,47-octa-tert-butyl-49,50,51,52,53,54,55,56-octa[4-(methoxycarbonyl)-benzyloxy]calix[8]arene (6) are obtained.

Example 4: Preparation of the Hydrogenated Isoprene-Styrene Star Polymer from the Calixarene of the Formula (6)

8 kg of anhydrous cyclohexane are introduced under an inert gas atmosphere (0.5 bar, $N_2$) into a 15 litre reactor equipped with a heating jacket and stirrer. 47 g of styrene and 1.2 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of isoprene are added. After 30 minutes, once isoprene conversion is complete, 1.99 g (0.800 mmol) of the calixarene of the formula (6) are added in a tetrahydrofuran solution. The reaction mixture is then maintained at a temperature of 40° C. for 45 minutes.

The mixture is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The solution is then placed under hydrogen pressure (15 bar) and maintained at a temperature of 120° C. for 1 h and 30 minutes while being stirred. The solution is then transferred into a tank, has antioxidants (2.6 g of Irganox 565 and 17.0 g of Irgafos 168) added and is then subsequently transferred into a stripping system in which the solvent is removed by steam; the resultant granular product is then dried in a vacuum oven.

The characteristics of the resultant hydrogenated star polymer are shown in Table 1.

Example 5: Preparation of the Hydrogenated Butadiene-Styrene Star Polymer from the Calixarene of the Formula (6)

8 kg of anhydrous cyclohexane are introduced under an inert gas atmosphere (0.5 bar, $N_2$) into a 15 litre reactor equipped with a heating jacket and stirrer. 47 g of styrene and 95 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of 1,3-butadiene are added. After 30 minutes, once butadiene conversion is complete, 1.99 g (0.800 mmol) of the calixarene of the formula (6) are added in a tetrahydrofuran solution. The reaction mixture is then maintained at a temperature of 40° C. for 45 minutes. The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The mixture is then placed under hydrogen pressure (15 bar) and maintained at a temperature of 120° C. for 1 h while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 2.

Example 6: Preparation of the Hydrogenated Star Polybutadiene from the Calixarene of the Formula (6)

8 kg of anhydrous cyclohexane are introduced under an inert gas atmosphere (0.5 bar, $N_2$) into a 15 litre reactor equipped with a heating jacket and stirrer. 500 g of 1,3-butadiene and 95 g of tetrahydrofuran are then added. The solution is then thermostated to 40° C. Once said temperature has been reached, 0.82 g of n-butyllithium in a cyclohexane solution (12.80 mmol) are added. After 20 minutes, once butadiene conversion is complete, 1.99 g (0.800 mmol) of the calixarene of the formula (6) are added in a tetrahydrofuran solution. The reaction mixture is then maintained at a temperature of 40° C. for 45 minutes.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The mixture is then placed under hydrogen pressure (15 bar) and maintained at a temperature of 120° C. for 1 h while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 2.

Example 7: Synthesis of the Calixarene of the Formula (8)

A calix[8]arene derivative which may be used according to a further preferred embodiment of the present invention for synthesising star polymers is 5,11,17,23,29,35,41,47-octa-tert-butyl-49,50,51,52,53,54,55,56-octa-(3-triethoxysilyl-propoxy)calix[8]arene, which may be represented by the structure (8):

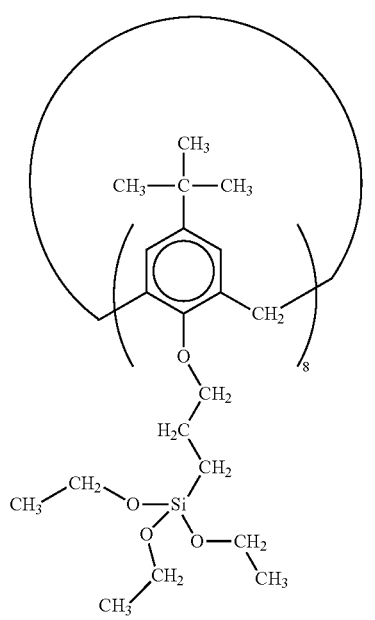

(8)

8.25 g (6.36 mmol) of p-tert-butylcalix[8]arene (2), the synthesis of which is described in Example 1, 13.3 mL (153 mmol) of bromoallyl, 4.3 g (76 mmol) of KOH, 2 mL of PEG 600, 20 mL of distilled water and 20 mL of dichloromethane are introduced into a 100 mL 3-necked glass flask fitted with a stirrer, thermometer and condenser. The mixture is kept under an inert atmosphere and at room temperature for 24 hours. 100 mL (100 mmol) of 1N HCl are added, the mixture is stirred and transferred into a separating funnel where the organic phase is extracted with chloroform, separating it from the aqueous phase. The solvent is removed under reduced pressure, resulting in a white solid.

Once dried, the product is recrystallised from methanol. 5.96 g (yield 58%) of the product 5,11,17,23,29,35,41,47-octa-tert-butyl-49,50,51,52,53,54,55,56-octa-allyloxy-calix[8]arene (7) are obtained. 5.96 g (3.69 mmol) of 5,11,17,23,29,35,41,47-octa-tert-butyl-49,50,51,52,53,54,55,56-octa-allyloxy-calix[8]arene (7), 8.16 mL (44.28 mmol) of triethoxysilane, 100 mg (0.19 mmol) of dihydrogen hexachloroplatinate(VI) hexahydrate and 50 mL of toluene are introduced under an inert atmosphere into a 100 mL 3-necked glass flask fitted with a stirrer, thermometer and condenser. The mixture is adjusted to reflux while being stirred and maintained under such conditions for 16 hours.

The mixture is hot filtered and the solvent present in the filtrate is removed under reduced pressure. Once dried, the product is recrystallised from heptane.

7.55 g (yield 70%) of the product 5,11,17,23,29,35,41,47-octa-tert-butyl-49,50,51,52,53,54,55,56-octa-(3-triethoxysilylpropoxy)calix[8]arene (8) are obtained.

Example 8: Preparation of the Hydrogenated Isoprene-Styrene Star Polymer from the Calixarene of the Formula (8)

8 kg of anhydrous cyclohexane are introduced under an inert gas atmosphere (0.5 bar, $N_2$) into a 15 litre reactor equipped with a heating jacket and stirrer. 47 g of styrene and 1.2 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of isoprene are added. After 30 minutes, once isoprene conversion is complete, 1.56 g (0.533 mmol) of the calixarene of the formula (8) are added in a tetrahydrofuran solution. The reaction mixture is then maintained at a temperature of 40° C. for 1 h.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The mixture is then placed under hydrogen pressure (15 bar) and maintained at a temperature of 120° C. for 1 h and 30 minutes while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 1.

Example 9: Synthesis of the Calixarene of the Formula (12)

A calix[8]arene derivative which may be used according to a further preferred embodiment of the present invention for synthesising star polymers is 5,11,17,23,29,35,41,47- octa-methoxycarbonyl-49,50,51,52,53,54,55,56-octa-[4-(methoxycarbonyl)benzyloxy]calix[8]arene, which may be represented by the structure (12):

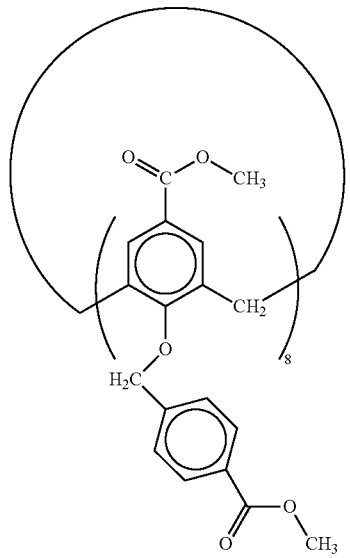

4.10 g (4.83 mmol) of calix[8]arene (3), the synthesis of which is described in Example 1, 60.8 g (443 mmol) of hexamethylenetetramine (HMTA) and 450 mL of trifluoroacetic acid are introduced under an inert atmosphere into a 2 L 3-necked flask fitted with a mechanical paddle stirrer, thermometer and condenser. The mixture is adjusted, while being stirred, to a temperature of 140° C. and maintained under such conditions for 5 hours.

500 mL (100 mmol) of 1N HCl and 500 mL of $CHCl_3$ are added, the mixture is stirred and the organic phase is separated from the aqueous phase in a separating funnel.

The solvent is removed under reduced pressure and the resultant solid is recrystallised from dichloromethane.

3.63 g (yield 70%) of the product 5,11,17,23,29,35,41,47-octa-formyl-calix[8]arene (9) are obtained as a dark yellow solid.

3.63 g (3.38 mmol) of 5,11,17,23,29,35,41,47-octa-formyl-calix[8]arene (9) in 60 mL of DMSO and 50 mL of distilled water are introduced under an inert atmosphere into a 500 mL 3-necked glass flask fitted with a mechanical paddle stirrer, thermometer and condenser.

Subsequently, 0.48 g (4.04 mmol) of $NaH_2PO_4$ and dropwise, over a period of 3 hours, a solution of 10 g (111 mmol) of $NaClO_2$ in 50 mL of distilled water are added to the mixture.

The reaction mixture is left at room temperature for 12 hours with stirring.

50 mL (approx. 500 mmol) of concentrated HCl are added.

The reaction mixture is adjusted to 5° C. and left under such conditions for 12 hours and the solid which forms is filtered, washed with distilled water and methanol and subsequently dried.

2.44 g (yield 60%) of the product 5,11,17,23,29,35,41,47-octa-hydroxycarbonyl-calix[8]arene (10) are obtained as a brown solid.

2.44 g (2.03 mmol) of 5,11,17,23,29,35,41,47-octa(hydroxycarbonyl)calix[8]arene (10), 1 mL (10 mmol) of concentrated $H_2SO_4$ and 200 mL (5 mol) of methanol are introduced under an inert atmosphere into a 500 mL 3-necked glass flask fitted with a mechanical stirrer, thermometer and condenser. The mixture is adjusted to reflux while being stirred and left for 24 hours under such conditions.

The solvent is removed under reduced pressure and the resultant solid is recrystallised from methanol and subsequently dried.

2.58 g (yield 97%) of the product 5,11,17,23,29,35,41,47-octa-methoxycarbonyl-calix[8]arene (11) are obtained as a brown solid.

2.58 g (1.97 mmol) of 5,11,17,23,29,35,41,47-octa-methoxycarbonyl-calix[8]arene (11), 5.10 g (22.3 mmol) of 4-(bromomethyl)methyl benzoate, 1.59 g (9.58 mmol) of KI, 4.11 g (9.58 mmol) of $K_2CO_3$ and 50 mL of acetone are introduced under an inert atmosphere to a 100 mL 3-necked flask fitted with a stirrer, thermometer and condenser. The mixture is adjusted to reflux while being stirred and maintained for 48 hours under such operating conditions.

After cooling to room temperature, 50 mL (50 mmol) of 1N HCl are added, the mixture is stirred and extracted with toluene in a separating funnel, separating the organic phase from the aqueous phase.

The solvent is removed under reduced pressure, resulting in a brown solid.

Once dried, the product is recrystallised from methanol.

2.72 g (yield 55.3%) of the product, 5,11,17,23,29,35,41,47-octa-methoxycarbonyl-49,50,51,52,53,54,55,56-octa[4-(methoxycarbonyl)benzyloxy]calix[8]arene (12) are obtained.

Example 10: Preparation of the Hydrogenated Isoprene-Styrene Star Polymer from the Calixarene of the Formula (12)

8 kg of anhydrous cyclohexane are introduced under an inert gas atmosphere (0.5 bar, $N_2$) into a 15 litre reactor equipped with a heating jacket and stirrer. 47 g of styrene and 1.2 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of isoprene are added. After 30 minutes, once isoprene conversion is complete, 1.00 g (0.400 mmol) of the calixarene of the formula (12) are added in a tetrahydrofuran solution. The reaction mixture is then maintained at a temperature of 40° C. for 1 h.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The solution is then placed under hydrogen pressure (15 bar) and maintained at a temperature of 120° C. for 1 h and 30 minutes. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 1.

Example 11: Preparation of the Hydrogenated Butadiene-Styrene Star Polymer from the Calixarene of the Formula (12)

8 kg of anhydrous cyclohexane are introduced under an inert gas atmosphere (0.5 bar, $N_2$) into a 15 litre reactor equipped with a heating jacket and stirrer. 47 g of styrene and 95 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of 1,3-butadiene are added. After 30 minutes, once butadiene conversion is complete, 1.00 g (0.400 mmol) of the calixarene of the formula (12) are added in a tetrahydrofuran solution. The reaction mixture is then maintained at a temperature of 40° C. for 1 h. The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The mixture is then placed under hydrogen pressure (15 bar) and maintained at a temperature of 120° C. for 1 h while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 2.

Example 12: Synthesis of the Calixarene of the Formula (16)

A calix[8]arene derivative which may be used according to a further preferred embodiment of the present invention for synthesising star polymers is 5,11,17,23,29,35,41,47-octa-(3-triethoxysilylpropyl)-49,50,51,52,53,54,55,56-octa-(3-triethoxysilylpropoxy)calix[8]arene, which may be represented by the structure (16):

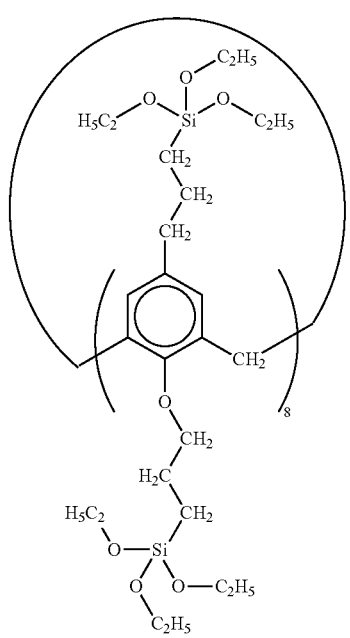

(16)

4.10 g (4.84 mmol) of calix[8]arene (3), the synthesis of which is described in Example 1, 10.1 mL (116 mmol) of bromoallyl, 3.3 g (59 mmol) of KOH, 1.5 mL of PEG 600, 15 mL of distilled water and 15 mL of chloroform are introduced under an inert atmosphere into a 100 mL 3-necked flask fitted with a stirrer, thermometer and condenser. The mixture is kept at room temperature for 24 hours under an inert atmosphere. 75 mL (75 mmol) of 1N HCl are added, the mixture is stirred and extraction performed with chloroform, separating the organic phase from the aqueous phase in a separating funnel.

The solvent is removed under reduced pressure, resulting in a white solid.

Once dried, the product is recrystallised from methanol. 4.07 g (yield 72%) of the product 49,50,51,52,53,54,55,56-octa-allyloxycalix[8]arene (13) are obtained. 4.07 g (3.49 mmol) of 49,50,51,52,53,54,55,56-octa-allyloxycalix[8]arene (13) and 50 mL of N,N-diethylaniline are introduced under an inert atmosphere into a 100 mL 3-necked flask fitted with a stirrer, thermometer and condenser. The mixture is adjusted to reflux while being stirred and maintained under such conditions for 2 hours.

After cooling to room temperature, 250 mL of ice and 250 mL (250 mmol) of 1N HCl are added.

The mixture is filtered and the solid product is recrystallised from 2-propanol, resulting in 3.01 g (yield 74%) of 5,11,17,23,29,35,41,47-octa-allyl-calix[8]arene (14). 3.01 g (2.58 mmol) of 5,11,17,23,29,35,41,47-octa-allyl-calix[8]arene (14), 7.5 mL (86 mmol) of bromoallyl, 2.44 g (44 mmol) of KOH, 1 mL of PEG 600, 10 mL of distilled water and 10 mL of chloroform are introduced under an inert atmosphere into a 50 mL 3-necked flask fitted with a magnetic stirrer, thermometer and condenser. The mixture is kept at room temperature for 24 hours under an inert atmosphere.

50 mL (50 mmol) of 1N HCl are added, the mixture is stirred and extraction performed with chloroform, separating the aqueous phase from the organic phase in a separating funnel.

The solvent is removed under reduced pressure, resulting in a white solid.

Once dried, the product is recrystallised from methanol. 2.61 g (yield 68%) of the product 5,11,17,23,29,35,41,47-octa-allyl-49,50,51,52,53,54,55,56-octa-allyloxycalix[8]arene (15) are obtained. 2.61 g (1.75 mmol) of 5,11,17,23,29,35,41,47-octa-allyl-49,50,51,52,53,54,55,56-octa-allyloxycalix[8]arene (15), 7.74 mL (42 mmol) of triethoxysilane, 100 mg (0.19 mmol) of hydrogen hexachloroplatinate(VI) hexahydrate and 50 mL of toluene are introduced under an inert atmosphere into a 100 mL 3-necked glass flask fitted with a stirrer, thermometer and condenser. The mixture is adjusted to reflux while being stirred and maintained under such conditions for 16 hours.

The mixture is hot filtered and the solvent present in the filtrate is removed under reduced pressure.

Once dried, the product is recrystallised from heptane. 5.05 g (yield 70%) of the product 5,11,17,23,29,35,41,47-octa-(3-triethoxysilylpropyl)-49,50,51,52,53,54,55,56-octa-(3-triethoxysilylpropoxy)calix[8]arene (16) are obtained.

Example 13: Preparation of the Hydrogenated Butadiene-Styrene Star Polymer from the Calixarene of the Formula (16)

8 kg of anhydrous cyclohexane are introduced under an inert gas atmosphere (0.5 bar, $N_2$) into a 15 litre reactor equipped with a heating jacket and stirrer. 47 g of styrene and 95 g of tetrahydrofuran are then added. The solution is then thermostated to 40° C. Once said temperature has been reached, 0.82 g of n-butyllithium in a cyclohexane solution (12.80 mmol) are added. After 20 minutes, once styrene conversion is complete, 423 g of 1,3-butadiene are added. After 30 minutes, once butadiene conversion is complete, 1.10 g (0.267 mmol) of the calixarene of the formula (16) are added in a tetrahydrofuran solution. The reaction mixture is then maintained at a temperature of 40° C. for 1 h and 15 minutes.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The solution is then placed under hydrogen pressure (15 bar) and maintained at a temperature of 120° C. for 1 h while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 2.

Example 14: Preparation of a Second Hydrogenated Butadiene-Styrene Star Polymer from the Calixarene of the Formula (16)

8 kg of anhydrous cyclohexane are introduced under an inert gas atmosphere (0.5 bar, $N_2$) into a 15 litre reactor equipped with a heating jacket and stirrer. 47 g of styrene and 95 g of tetrahydrofuran are then added. The solution is then thermostated to 40° C. Once said temperature has been reached, 2.47 g of n-butyllithium in a cyclohexane solution (38.56 mmol) are added. After 20 minutes, once styrene conversion is complete, 423 g of 1,3-butadiene are added. After 30 minutes, once butadiene conversion is complete, 3.31 g (0.803 mmol) of the calixarene of the formula (16) are added in a tetrahydrofuran solution. The reaction mixture is then maintained at a temperature of 40° C. for 1 h and 15 minutes.

The solution is then transferred, still under an inert gas atmosphere, into another 15 litre reactor, equipped with a heating jacket and stirrer, which is set up for hydrogenation. 1.61 g of butylethylmagnesium in a heptane solution and 1.22 g of bis-cyclopentadienyltitanium dichloride in a cyclohexane suspension are added. The solution is then placed under hydrogen pressure (15 bar) and maintained at a temperature of 120° C. for 1 h while being stirred. The solution is then transferred into a tank, has antioxidants (2.6 g of Irganox 565 and 17.0 g of Irgafos 168) added and is subsequently transferred into a stripping system in which the solvent is removed by steam; the resultant granular product is then dried in a vacuum oven.

The characteristics of the resultant hydrogenated star polymer are shown in Table 2.

TABLE 1

HYDROGENATED ISOPRENE-STYRENE STAR POLYMERS AND CHARACTERISTICS THEREOF

| Product | Example 2 | Example 4 | Example 8 | Example 10 |
|---|---|---|---|---|
| Type of core | Calixarene (5) | Calixarene (6) | Calixarene (8) | Calixarene (12) |
| Calixarene structure | | | | |
| $R_1$ | —$C_6H_{13}$ | —$CH_2(CH_6H_5)COOCH_3$ | —$(CH_2)_3Si(OC_2H_5)_3$ | —$CH_2(CH_6H_5)COOCH_3$ |
| $R_2$ | —$CH_2Cl$ | —$C(CH_3)_3$ | —$C(CH_3)_3$ | —$COOCH_3$ |
| $R_3$ | H | H | H | H |
| $R_4$ | H | H | H | H |
| $R_5$ | H | H | H | H |
| $R_6$ | H | H | H | H |
| n | 8 | 8 | 8 | 8 |
| Polymer segment structure | | | | |
| Monomers | Isoprene-styrene | Isoprene-styrene | Isoprene-styrene | Isoprene-styrene |
| % hydrogenation | 95 | 93 | 94 | 94 |
| % by weight styrene | 10 | 10 | 10 | 10 |
| Polymer properties | | | | |
| Mw * $10^3$, dalton (a) | 280 | 345 | 480 | 609 |
| Mw * $10^3$, dalton (a) | 224 | 278 | 384 | 483 |
| Mw * $10^3$ polymer segments, dalton (a) | 70 | 43 | 40 | 39 |
| Mw/Mn | 1.25 | 1.24 | 1.25 | 1.26 |
| Theoretical number of polymer segments | 8 | 16 | 24 | 32 |

(a) values obtained by GPC/UV

TABLE 2

HYDROGENATED BUTADIENE-STYRENE AND BUTADIENE STAR
POLYMERS AND CHARACTERISTICS THEREOF
EXAMPLES 15-25: LUBRICANT FORMULATIONS

| Product | Example 5 | Example 6 | Example 11 | Example 13 | Example 14 |
|---|---|---|---|---|---|
| Type of core | Calixarene (6) | Calixarene (6) | Calixarene (12) | Calixarene (16) | Calixarene (16) |
| Calixarene structure | | | | | |
| $R_1$ | —CH$_2$(CH$_6$H$_5$)COOCH$_3$ | —CH$_2$(CH$_6$H$_5$)COOCH$_3$ | —CH$_2$(CH$_6$H$_5$)COOCH$_3$ | —(CH$_2$)$_3$Si(OC$_2$H$_5$)$_3$ | —(CH$_2$)$_3$Si(OC$_2$H$_5$)$_3$ |
| $R_2$ | —C(CH$_3$)$_3$ | —C(CH$_3$)$_3$ | —COOCH$_3$ | —(CH$_2$)$_3$Si(OC$_2$H$_5$)$_3$ | —(CH$_2$)$_3$Si(OC$_2$H$_5$)$_3$ |
| $R_3$ | H | H | H | H | H |
| $R_4$ | H | H | H | H | H |
| $R_5$ | H | H | H | H | H |
| $R_6$ | H | H | H | H | H |
| n | 8 | 8 | 8 | 8 | 8 |
| Polymer segment structure | | | | | |
| Monomers | butadiene-styrene | butadiene | butadiene-styrene | butadiene-styrene | butadiene-styrene |
| % 1,2-vinyl | 55 | 54 | 55 | 53 | 54 |
| % hydrogenation | 99 | 99 | 98 | 98 | 99 |
| % by weight styrene | 10 | 0 | 10 | 10 | 10 |
| Polymer properties | | | | | |
| Mw * 10$^3$, dalton (a) | 354 | 343 | 600 | 807 | 340 |
| Mw * 10$^3$, dalton (a) | 295 | 281 | 480 | 621 | 274 |
| Mw * 10$^3$ polymer segments, dalton (a) | 42 | 41 | 38 | 37 | 14 |
| Mw/Mn | 1.20 | 1.22 | 1.25 | 1.3 | 1.24 |
| Theoretical number of polymer segments | 16 | 16 | 32 | 48 | 48 |

(a) values obtained by GPC/UV

The solutions of star polymers were prepared in Group I Solvent Neutral 150 base oil (eni SN 150). Dissolution was carried out by heating the base oil to a temperature of 130° C., adding the polymer and stirring at this temperature until dissolution was complete. Tables 3 and 4 show the concentrations of the star polymers in the base oil. Using the same operating conditions, solutions in base oil SN 150 were then prepared of the commercial product Infineum Shellvis 260 (SV 260), which is a hydrogenated styrene-isoprene star polymer with a PDVB core, and of the commercial product eni MX 4006, which is a linear ethylene-propylene copolymer. Table 5 shows the concentrations of the commercial polymers in the base oil.

The following parameters, shown in Tables 3, 4 and 5, were determined on the solutions of the polymers in the base oil:
   shear stability index (method CEC-L-14-93);
   thickening power.

The shear stability index was determined on a solution made up of 10% by weight of the polymer solution in base oil and by 90% by weight of base oil SN 150.

Thickening power is calculated as the difference between the kinematic viscosity value at 100° C. of the 1% by weight polymer solution in SN 150 and the kinematic viscosity value at 100° C. of the SN 150 oil.

Using the concentrated solutions of polymers as viscosity index-improver additives, corresponding engine lubricating oils of viscosity grade SAE 10W-40 of the following composition, expressed as percentage by weight relative to the lubricating oil, were prepared:

base oils: 79.1% by weight;
additive package (DI package): 13.8% by weight;
viscosity index (VI) improver: 7% by weight;
pour point depressant (PPD) additive: 0.1% by weight.

50 parts per million (ppm) of foam inhibitor were also added to the lubricant.

The additive package used is a mixture of the following additives: dispersants, detergents, antioxidants and antiwear additives.

The following parameters were determined on the lubricating oils:
   kinematic viscosity at 100° C. (method ASTM D 445)
   kinematic viscosity at 40° C. (method ASTM D 445)
   viscosity index (method ASTM D 2270)
   CCS viscosity at −25° C. (method ASTM D 5293)
   MRV viscosity at −30° C. (method ASTM D 4684)
   MRV yield stress (method ASTM D 4684)
   percentage viscosity loss by depolymerisation (method CEC L-14-93)
   gelation index (method ASTM D 5133)
   gelation temperature (method ASTM D 5133)
   HTHS viscosity (method CEC L-36-90)
   pour point (method ASTM D 6892)
   high-temperature deposits (method ASTM D 7097).

Tables 3, 4 and 5 show the results.

TABLE 3

LUBRICANT FORMULATIONS WITH HYDROGENATED ISOPRENE-STYRENE STAR POLYMERS

| Formulations | Example 15 | Example 16 | Example 17 | Example 18 |
|---|---|---|---|---|
| Polymer | Example 2 | Example 4 | Example 8 | Example 10 |
| Thickening power at 100° C. (cSt) (1% by weight polymer in SN 150) | 6.6 | 7.6 | 9.6 | 11.5 |
| Concentrated solution of the polymer in base oil | | | | |
| Polymer content (% by weight) | 12.0 | 10.45 | 8.3 | 6.9 |
| Base oil SN 150 (% by weight) | 88.0 | 89.55 | 91.7 | 93.1 |
| Shear stability index (%) | 23 | 7 | 13 | 17 |
| Composition and properties of 10W-40 oil | | | | |
| Concentrated solution of polymer (VI improver) (% by weight) | 7 | 7 | 7 | 7 |
| Base oils (% by weight) | 79.1 | 79.1 | 79.1 | 79.1 |
| Additive package (% by weight) | 13.8 | 13.8 | 13.8 | 13.8 |
| Pour point depressant (% by weight) | 0.1 | 0.1 | 0.1 | 0.1 |
| Kinematic viscosity at 40° C. (cSt) | 92.05 | 92.26 | 92.14 | 91.50 |
| Kinematic viscosity at 100° C. (cSt) | 13.71 | 13.78 | 13.78 | 13.62 |
| Viscosity index | 151 | 152 | 152 | 151 |
| HTHS viscosity (cP) | 3.72 | 3.85 | 3.91 | 3.95 |
| CCS viscosity at −25° C. (cP) | 6900 | 6650 | 6400 | 6350 |
| MRV viscosity at −30° C. (cP) | 28200 | 26600 | 26500 | 25600 |
| MRV yield stress | <35 | <35 | <35 | <35 |
| Viscosity loss by depolymerisation (%) | 11.5 | 3.6 | 6.7 | 8.7 |
| Gelation index | 4.1 | 4.5 | 4.5 | 4.6 |
| Gelation temperature (° C.) | −29.8 | −29.5 | −29.1 | −28.1 |
| Pour point (° C.) | −39 | −39 | −39 | −39 |
| Total TEOST MHT deposits (mg) | 28.5 | 25.0 | 22.6 | 21.4 |

TABLE 4

LUBRICANT FORMULATIONS WITH HYDROGENATED BUTADIENE-STYRENE AND BUTADIENE STAR POLYMERS

| Formulations | Example 19 | Example 20 | Example 21 | Example 22 | Example 23 |
|---|---|---|---|---|---|
| Polymer | Example 5 | Example 6 | Example 11 | Example 13 | Example 14 |
| Thickening power at 100° C. (cSt) (1% by weight polymer in SN 150) | 6.3 | 6.4 | 9.5 | 12.4 | 6.2 |
| Concentrated solution of the polymer in base oil | | | | | |
| Polymer content (% by weight) | 12.40 | 12.20 | 8.20 | 6.30 | 12.40 |
| Base oil SN 150 (% by weight) | 87.60 | 88.80 | 92.80 | 93.70 | 96.6 |
| Shear stability index (%) | 9 | 10 | 22 | 32 | 3 |
| Composition and properties of 10W-40 oil | | | | | |
| Concentrated solution of polymer (VI improver) (% by weight) | 7 | 7 | 7 | 7 | 7 |
| Base oils (% by weight) | 79.1 | 79.1 | 79.1 | 79.1 | 79.1 |
| Additive package (% by weight) | 13.8 | 13.8 | 13.8 | 13.8 | 13.8 |
| Pour point depressant (% by weight) | 0.1 | 0.1 | 0.1 | 0.1 | 0.1 |
| Kinematic viscosity at 40° C. (cSt) | 91.15 | 92.55 | 91.30 | 93.45 | 92.46 |
| Kinematic viscosity at 100° C. (cSt) | 13.65 | 13.82 | 13.60 | 13.86 | 13.77 |
| Viscosity index | 152 | 152 | 151 | 151 | 151 |
| HTHS viscosity (cP) | 3.95 | 3.90 | 3.86 | 3.75 | 3.93 |
| CCS viscosity at −25° C. (cP) | 6800 | 6750 | 6500 | 6300 | 6850 |
| MRV viscosity at −30° C. (cP) | 27300 | 26500 | 25000 | 23400 | 27500 |
| MRV yield stress | <35 | <35 | <35 | <35 | <35 |

TABLE 4-continued

LUBRICANT FORMULATIONS WITH HYDROGENATED BUTADIENE-STYRENE AND BUTADIENE STAR POLYMERS

| Formulations | Example 19 | Example 20 | Example 21 | Example 22 | Example 23 |
|---|---|---|---|---|---|
| Viscosity loss by depolymerisation (%) | 4.8 | 5.3 | 11.7 | 17.1 | 1.6 |
| Gelation index | 4.2 | 4.8 | 4.3 | 4.4 | 4.3 |
| Gelation temperature (° C.) | −28.9 | −27.9 | −26.0 | −25.9 | −26.0 |
| Pour point (° C.) | −42 | −42 | −42 | −42 | −42 |
| Total TEOST MHT deposits (mg) | 25.1 | 32.5 | 24.7 | 23.6 | 24.0 |

TABLE 5

LUBRICANT FORMULATIONS WITH COMMERCIAL POLYMERS MX 4006 AND SV 260

| Formulations | Comparative Example 24 | Comparative Example 25 |
|---|---|---|
| Polymer | MX 4006 | SV 260 |
| Thickening power at 100° C. (cSt) (1% by weight polymer in SN 150) | 5.2 | 7.5 |
| Concentrated solution of the polymer in base oil | | |
| Polymer content (% by weight) | 13.05 | 10.55 |
| Base oil SN 150 (% by weight) | 86.95 | 89.45 |
| Shear stability index (%) | 25 | 10 |
| Composition and properties of 10W-40 oil | | |
| Concentrated polymer solution (VI improver) (% weight) | 7 | 7 |
| Base oils (% by weight) | 79.1 | 79.1 |
| Additive package (% by weight) | 13.8 | 13.8 |
| Pour point depressant (% by weight) | 0.1 | 0.1 |
| Kinematic viscosity at 40° C. (cSt) | 94.65 | 91.28 |
| Kinematic viscosity at 100° C. (cSt) | 13.96 | 13.69 |
| Viscosity index | 151 | 152 |
| HTHS viscosity (cP) | 4.01 | 3.87 |
| CCS viscosity at −25° C. (cP) | 6780 | 6671 |
| MRV viscosity at −30° C. (cP) | 21500 | 29300 |
| MRV yield stress (mPa) | <35 | <35 |
| Viscosity loss by depolymerisation (%) | 11 | 5.2 |
| Gelation index | 5.3 | 4.7 |
| Gelation temperature (° C.) | −12.8 | −28.9 |
| Pour point (° C.) | −36 | −39 |
| Total TEOST MHT deposits (mg) | 31.7 | 25.7 |

On the basis of the results shown in Tables 3 and 4 and 5, it is clear that the radial polymers of the present invention with a central core made up of calixarenes have characteristics, such as thickening capacity, mechanical shear stability, oxidation stability and resistance to the formation of deposits and low-temperature behaviour, which make them highly suitable for use as viscosity index-improver additives in lubricating oils.

In particular, the polymer (Example 4) used in the formulation of Example 16, made up of a calixarene core to which are linked 16 hydrogenated isoprene-styrene polymer segments, exhibits mechanical shear stability (shear stability index, viscosity loss by depolymerisation) which is better than that of the commercial star product SV 260 (Comparative Example 26) which is made up of the same type of polymer segments, but with a PDVB core. Using the same calixarene of Example 4, but introducing 16 butadiene-styrene or polybutadiene polymer segments, gives rise to star polymers (Examples 5 and 6) which, when used in the formulations of Examples 19 and 20, exhibit thickening power and mechanical shear stability values which are good, but slightly worse than those obtained in Example 16. It is nevertheless preferred to use butadiene rather than isoprene for reasons of cost and commercial availability. Furthermore, introducing copolymers containing styrene (e.g. styrene-butadiene) onto the calixarene ensures greater resistance to the formation of deposits in comparison with the polydiene segments (e.g. polybutadiene).

Increasing the number of hydrogenated polymer segments of a similar molecular weight linked to the calixarene core, whether of the butadiene-styrene copolymer series (Examples 19, 21, and 22) or of the isoprene-styrene copolymer series (Examples 16, 17 and 18), results in a considerable increase in thickening power at the cost of a slight reduction in mechanical shear stability. In particular, the star polymers (Examples 10 and 13) used in the formulations of Examples 18 and 22 and respectively made up of 32 and 48 polymer segments, have thickening power values more than twice those, together with comparable mechanical shear stability values, of the commercial product eni MX 4006, a linear ethylene-propylene copolymer.

Furthermore, at identical thickening power, the larger is the number of polymer segments linked to the calixarene core, the better is mechanical shear stability. This is because the polymer (Example 14) used in the formulation of Example 23, made up of 48 low molecular weight hydrogenated butadiene-styrene polymer segments, exhibits the same thickening power as, but much better shear stability than, the polymer (Example 5) used in the formulation of Example 19 which is made up of 16 high molecular weight hydrogenated butadiene-styrene polymer segments.

The invention claimed is:
1. Hydrogenated polymers with a radial structure having a core made up of calixarenes of the general formula (I), to the core of which is linked a number P of hydrogenated linear polymer segments selected from:
    hydrogenated homopolymers or copolymers of conjugated dienes; or
    hydrogenated copolymers of said conjugated dienes and monoalkenyl arenes, and
    mixtures thereof,
    said formula (I) being

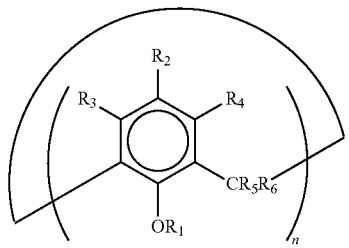

(I)

in which:

R$_1$, R$_2$, R$_3$ and R$_4$ are independently selected from hydrogen; a group containing carbon and hydrogen; a group also containing heteroatoms in addition to carbon and hydrogen; a group also containing silicon in addition to carbon, hydrogen and heteroatoms;

one of the two substituents R$_5$ and R$_6$ is hydrogen, while the other may be hydrogen or alkyl, with a number of carbon atoms between 1 and 6;

n is an integer in the range between 4 and 16.

2. Hydrogenated radial polymers according to claim 1, in which the linear polymer segments are hydrogenated homopolymers or hydrogenated copolymers of conjugated dienes selected from butadiene, isoprene, 1,3-pentadiene, 2,3-dimethyl-1,3-butadiene, 3-butyl-1,3-octadiene, 1-phenyl-1,3-butadiene and 1,3-hexadiene.

3. Hydrogenated radial polymers according to claim 2, in which the linear polymer segments are selected from homopolymers or copolymers of butadiene and isoprene.

4. Hydrogenated radial polymers in which the linear polymer segments are hydrogenated copolymers of the conjugated dienes according to claim 2 and of monoalkenyl arenes selected from styrene, ortho-methylstyrene, para-methylstyrene, meta-methylstyrene, tert-butylstyrene and monovinylnaphthalene.

5. Hydrogenated radial polymers according to claim 4, in which the linear polymer segments are hydrogenated copolymers of butadiene and styrene, or hydrogenated copolymers of isoprene and styrene.

6. Hydrogenated radial polymers according to claim 1, in which R$_1$ and R$_2$ may be selected from:

an alkyl having a number of carbon atoms between 1 and 24; or a group also containing heteroatoms in addition to carbon and hydrogen and having a number of carbon atoms between 1 and 16; or a group also containing silicon in addition to carbon, hydrogen and heteroatoms in which the number of carbon atoms varies between 5 and 21; or an unsaturated hydrocarbon group, with or without heteroatoms, having a number of carbon atoms between 2 and 16.

7. Hydrogenated radial polymers according to claim 1 in which R$_3$, R$_4$, R$_5$ and R$_6$ are simultaneously hydrogen.

8. Hydrogenated radial polymers according to claim 1, in which P is between 4 and 72.

9. Hydrogenated radial polymers according to claim 1, in which the weight-average molecular weight (M$_W$) of each of the hydrogenated linear polymer segments which make up the hydrogenated radial polymer is between 10000 and 200000.

10. Hydrogenated radial polymers according to claim 1, in which the weight-average molecular weight (M$_W$) of the hydrogenated radial polymers is between 100000 and 2000000.

11. A synthesis method for the radial polymers according to claim 1 which comprises the following steps:

i. synthesising a calixarene of the general formula (I);

ii. preparing the linear polymer segments by anionic polymerisation in solution of one or more conjugated dienes, or by copolymerisation of one or more conjugated dienes and a monoalkenyl arene, in the presence of an ionic initiator to form a living anionic polymer;

iii. reacting the living anionic polymer obtained in (ii) with the calixarene synthesised in (i) to form a polymer with a radial structure; and iv. reacting, by selective hydrogenation, the olefinic unsaturations present in the radial polymer obtained in (iii) to obtain a hydrogenated radial polymer.

12. A synthesis method for the radial polymers according to claim 11, in which the living polymers are those arising from the copolymerisation of a conjugated diene with a monoalkenyl arene, and characterised by a monalkenyl arene content between 3% by weight and 30% by weight relative to the total weight of the copolymer, and a diene content between 97% by weight and 70% by weight relative to the total weight of the copolymer.

13. A method according to claim 12, in which the living polymers are those arising from the copolymerisation of butadiene and styrene, and are characterised by a styrene content between 5% by weight and 25% by weight relative to the total weight of the copolymer and a butadiene content between 95% by weight and 75% by weight relative to the total weight of the copolymer.

14. A method according to claim 11, in which the quantity of calixarene added in the coupling reaction of the living anionic polymer with the calixarene in step (iii) is between 0.8/P mol and 1.2/P mol per mol of living polymer.

15. A method according to claim 11, in which the coupling reaction of the living anionic polymer with the calixarene in step (iii) is carried out in the presence of an inert solvent selected from aliphatic hydrocarbons, aromatic hydrocarbons and ethers.

16. A method according to claim 15, in which the inert solvent is the same as that used in step (ii).

17. A method according to claim 11, in which the temperature at which the coupling reaction of the living anionic polymer with the calixarene is carried out in step (iii) is between 0° C. and 150° C., and said reaction is carried out under an inert atmosphere at an absolute pressure in the range between 0.5 and 10 atm.

18. A method according to claim 11, in which the radial polymer obtained in reaction stage (iii) is hydrogenated in reaction step (iv) in such a way that the degree of hydrogenation of the initially present olefinic unsaturations is greater than 85%.

19. The hydrogenated polymers with a radial structure according to claim 1 wherein one of the two substituents R5 and R6 is hydrogen, while the other is an alkyl, with a number of carbon atoms between 1 and 6.

* * * * *